United States Patent
Abedijaberi et al.

(10) Patent No.: US 12,481,112 B2
(45) Date of Patent: Nov. 25, 2025

(54) RIBBON WITH NON-OVERLAPPING INTERMITTENT BONDS BETWEEN OPTICAL FIBER SUBUNITS

(71) Applicant: CORNING RESEARCH & DEVELOPMENT CORPORATION, Corning, NY (US)

(72) Inventors: Arash Abedijaberi, Painted Post, NY (US); Ronald Steven Black, Hickory, NC (US); David Wesley Chiasson, Edmonton (CA); Darin Gregory Howe, Denver, NC (US); Gregory Alan Mills, Clemmons, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 217 days.

(21) Appl. No.: 18/134,131

(22) Filed: Apr. 13, 2023

(65) Prior Publication Data

US 2023/0251443 A1    Aug. 10, 2023

Related U.S. Application Data

(63) Continuation of application No. PCT/US2021/053322, filed on Oct. 4, 2021.
(Continued)

(51) Int. Cl.
*G02B 6/44* (2006.01)

(52) U.S. Cl.
CPC ........... *G02B 6/4403* (2013.01); *G02B 6/441* (2013.01)

(58) Field of Classification Search
CPC .............................. G02B 6/4403; G02B 6/441
(Continued)

(56) References Cited

U.S. PATENT DOCUMENTS

| 5,289,967 | A | 3/1994 | Bampton et al. |
| 9,086,555 | B2 | 7/2015 | Namazue et al. |

(Continued)

FOREIGN PATENT DOCUMENTS

WO    2022/046710 A1    3/2022

OTHER PUBLICATIONS

European Patent Application No. 21862531.7 Extended European Search Report dated Sep. 3, 2024; 5 Pages; European Patent Office.
(Continued)

*Primary Examiner* — Jerry M Blevins
(74) *Attorney, Agent, or Firm* — Thomas R. Irwin

(57) ABSTRACT

Embodiments of the disclosure relate to an optical fiber ribbon. The optical fiber ribbon includes a plurality of subunits each having a subunit coating surrounding at least one optical fiber. The subunit coating is made of a first material. The optical fiber ribbon also includes a plurality of bonds intermittently formed between adjacent subunits of the plurality of subunits. The plurality of bonds are made of a second material. Each bond of the plurality of bonds has a unique longitudinal position along a length of the optical fiber ribbon such that no other bond of the plurality of bonds is located at the unique longitudinal position. Further, each bond of the plurality of bonds includes a diffusion zone comprising a mixture of the first material and the second material.

25 Claims, 19 Drawing Sheets

Related U.S. Application Data

(60) Provisional application No. 63/093,358, filed on Oct. 19, 2020.

(58) Field of Classification Search
USPC .................................................. 385/114
See application file for complete search history.

(56) References Cited

U.S. PATENT DOCUMENTS

| | | |
|---|---|---|
| 9,389,386 B2 | 7/2016 | Matsuzawa et al. |
| 9,541,722 B2 | 1/2017 | Sajima et al. |
| 9,739,965 B2 | 8/2017 | Saji et al. |
| 9,766,397 B2 | 9/2017 | Homma |
| 9,880,368 B2 | 1/2018 | Debban et al. |
| 9,995,896 B2 | 6/2018 | Namazue et al. |
| 10,007,078 B2 | 6/2018 | Sato et al. |
| 10,488,609 B2 | 11/2019 | Sato et al. |
| 2002/0081084 A1 | 6/2002 | Matsumoto et al. |
| 2005/0058409 A1 | 3/2005 | Miao et al. |
| 2013/0156390 A1 | 6/2013 | Matsuzawa et al. |
| 2017/0031107 A1 | 2/2017 | Bringuier et al. |
| 2017/0090135 A1 | 3/2017 | Sato et al. |
| 2017/0219790 A1 | 8/2017 | Debban et al. |
| 2019/0022962 A1 | 1/2019 | Moriya et al. |
| 2019/0204519 A1 | 7/2019 | Sato et al. |
| 2019/0250347 A1 | 8/2019 | Fallahmohammadi et al. |
| 2019/0317289 A1 | 10/2019 | Sekine et al. |
| 2020/0081210 A1 | 3/2020 | Cignarale et al. |
| 2020/0271879 A1* | 8/2020 | Fallahmohammadi ............. G02B 6/448 |
| 2020/0292771 A1* | 9/2020 | Sekine ............. G02B 6/448 |
| 2023/0185047 A1* | 6/2023 | Chalk ............. G02B 6/4403 385/114 |

OTHER PUBLICATIONS

International Search Report and Written Opinion of the International Searching Authority; PCT/US2021/053322; dated Jan. 11, 2022; pp. 13; International Searching Authority.

Extended European Search Report, EP application No. 21883527.0, dated Sep. 20, 2024, 9 pages, EP patent office.

* cited by examiner

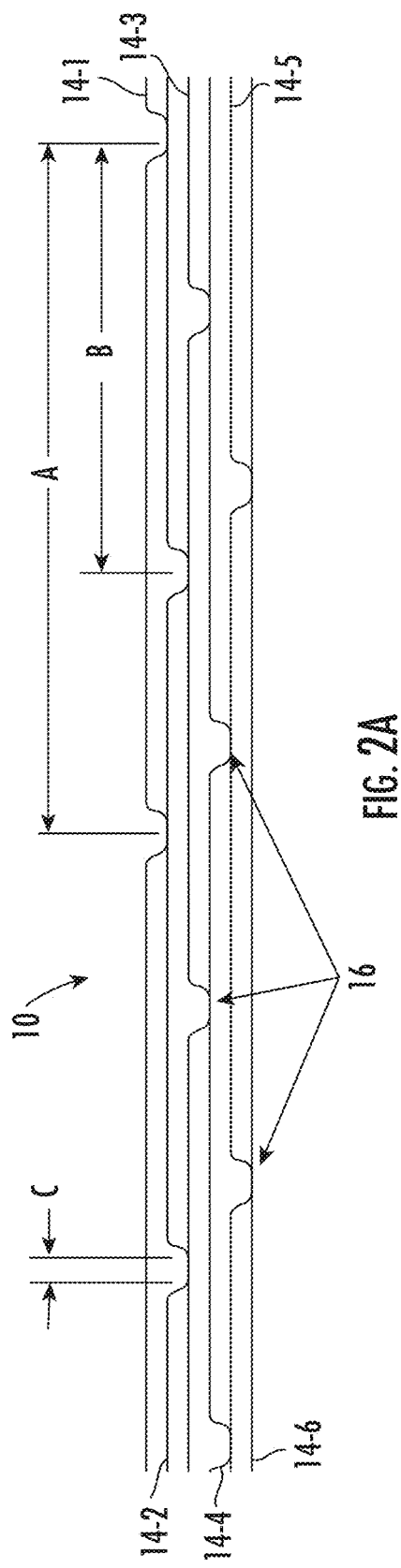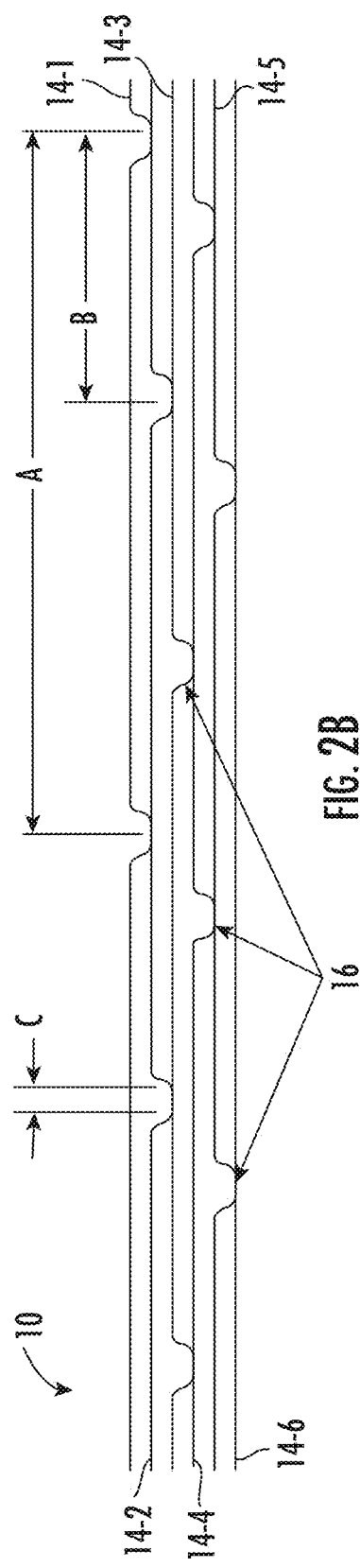

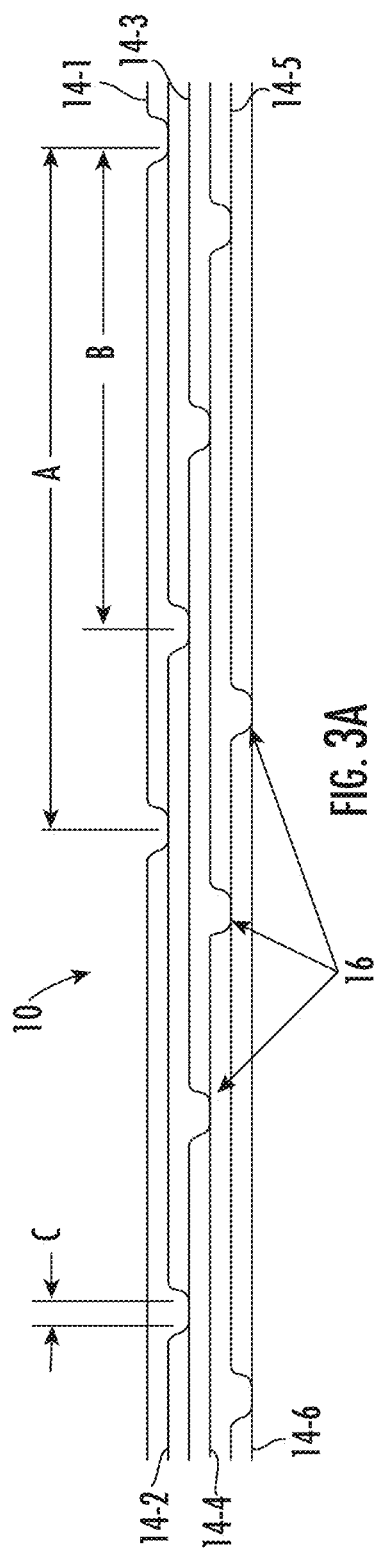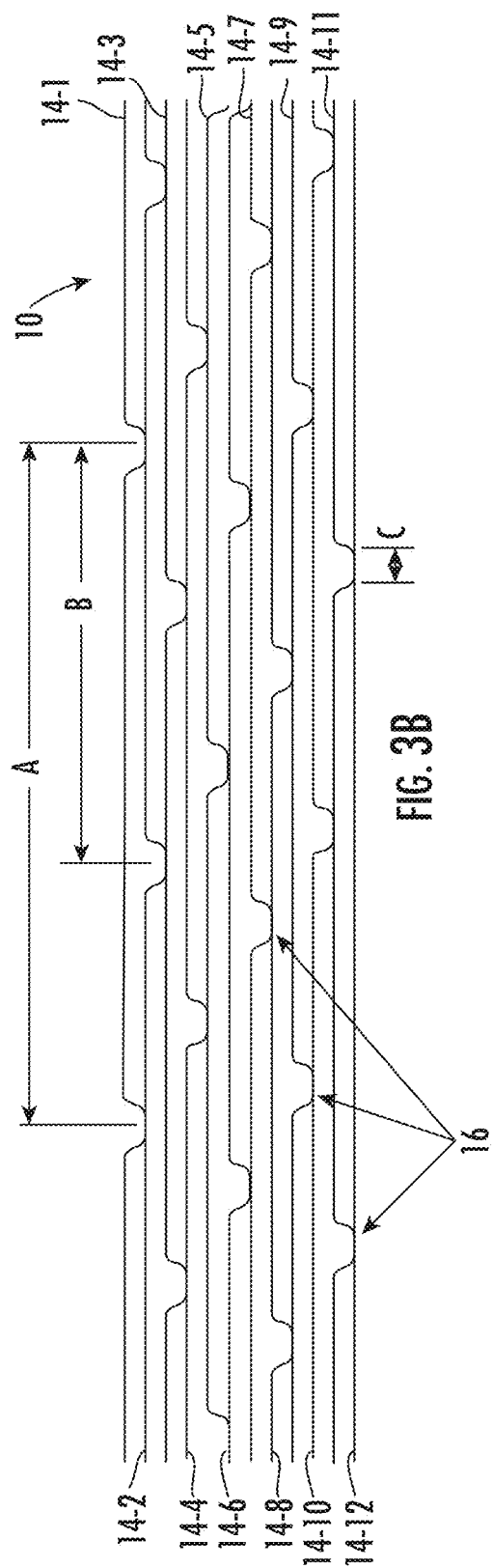

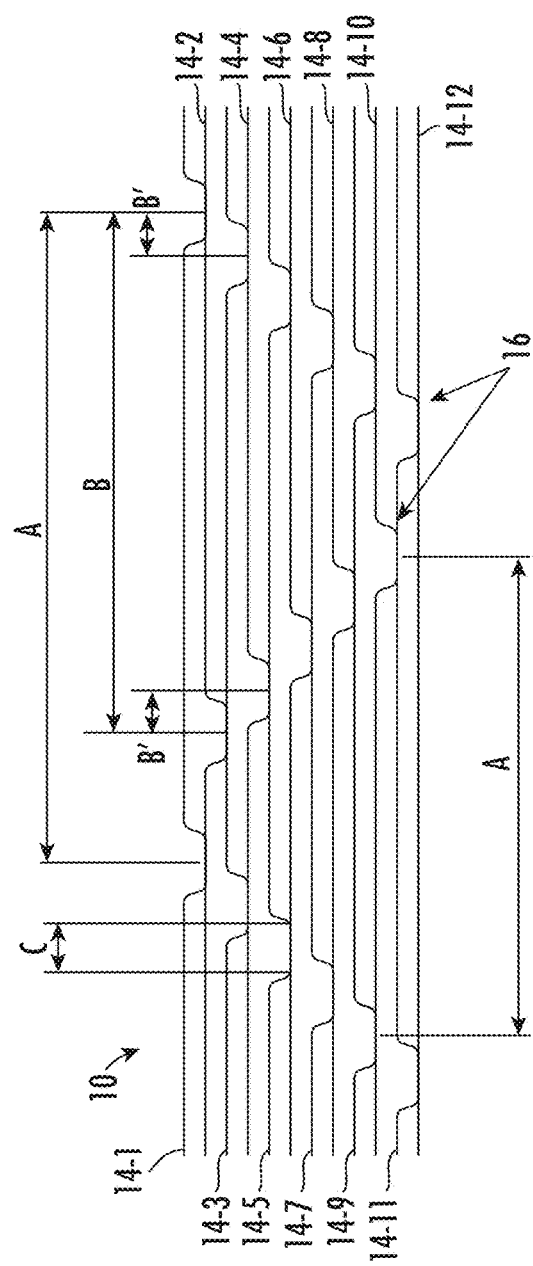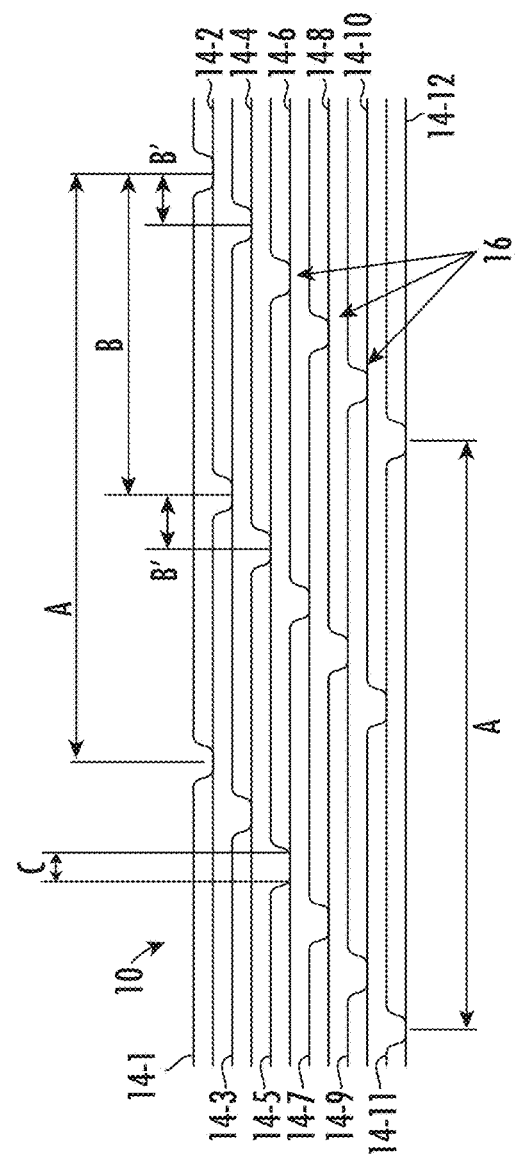

RIBBON WITH NON-OVERLAPPING INTERMITTENT BONDS BETWEEN OPTICAL FIBER SUBUNITS

CROSS-REFERENCE TO RELATED APPLICATIONS

This application is a continuation of International Application No. PCT/US2021/053322 filed Oct. 4, 2021, which claims the benefit of priority of U.S. Provisional Application Ser. No. 63/093,358 filed on Oct. 19, 2020, the content of which is relied upon and incorporated herein by reference in its entirety.

BACKGROUND

The disclosure relates generally to optical fibers, and specifically to optical fiber ribbons in which the optical fibers are intermittently bonded together along the length of the optical fiber ribbon. A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or groups of ribbons, may be color coded for the purposes of identification when making such connections. Further, the optical fiber cable may contain optical fibers arranged in ribbons to allow for multiple optical fibers to be grouped and to be fusion spliced together in a single operation. Arranging optical fibers into ribbons may lead to larger cable designs than if the optical fibers were loosely contained within the optical fiber cable.

SUMMARY

According to an aspect, embodiments of the disclosure relate to an optical fiber ribbon. The optical fiber ribbon includes a plurality of subunits each having a subunit coating surrounding at least one optical fiber. The subunit coating is made of a first material. The optical fiber ribbon also includes a plurality of bonds intermittently formed between adjacent subunits of the plurality of subunits. The plurality of bonds are made of a second material. Each bond of the plurality of bonds has a unique longitudinal position along a length of the optical fiber ribbon such that no other bond of the plurality of bonds is located at the unique longitudinal position. Further, each bond of the plurality of bonds includes a diffusion zone comprising a mixture of the first material and the second material.

According to another aspect, embodiments of the disclosure relate to a method of preparing an optical fiber ribbon. In the method, a plurality of optical fibers are arranged adjacent to each other along a length of the optical fiber ribbon. A coating of a first material is applied around the plurality of optical fibers to create a plurality of subunits. Each subunit of the plurality of subunits has at least one optical fiber. Bonds of a second material are intermittently applied between adjacent subunits of the plurality of subunits. The second material diffuses into the first material creating a diffusion zone of the second material in the first material, and each bond is located at a unique longitudinal position along the length of the optical fiber ribbon. Further, in the method, the first material and the second material are cured.

According to a further aspect, embodiments of the disclosure relate to an optical fiber ribbon. The optical fiber ribbon includes a first subunit including a first coating and at least one first optical fiber. The first coating surrounds the at least one first optical fiber. The optical fiber ribbon also includes a second subunit including a second coating and at least one second optical fiber. The second coating surrounds the at least one second optical fiber. The optical fiber ribbon also includes a third subunit including a third coating and at least one third optical fiber. The third coating surrounds the at least one third optical fiber. A first set of bonds is intermittently located along a length of the optical fiber ribbon. The first set of bonds joins the first subunit and the second subunit. A second set of bonds is intermittently located along the length of the optical fiber ribbon. The second set of bonds joins the second subunit and the third subunit. The first set of bonds and the second set of bonds do not overlap across a width of the optical fiber ribbon, and each bond of the first set of bonds and of the second set of bonds includes at least one saddle point.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

FIGS. 2A and 2B depict a schematic representation of an intermittent bonding pattern for a six subunit optical fiber ribbon, according to an exemplary embodiment;

FIGS. 3A and 3B depict a schematic representation of an intermittent bonding pattern based on the golden ratio for a six subunit optical fiber ribbon and for a twelve subunit optical fiber ribbon, respectively, according to an exemplary embodiment;

FIGS. 4A and 4B depict a schematic representation of a triangular and a sawtooth intermittent bonding pattern and parameters for producing same, according to exemplary embodiments;

DETAILED DESCRIPTION

Referring generally to the figures, various embodiments of an optical fiber ribbon having intermittent bonding regions between subunits as well as methods for producing such an optical fiber ribbon are provided. As described herein, the optical fiber ribbons according to the present disclosure are flexible such that the ribbons can be rolled, bundled, compressed widthwise, etc. from a planar configuration conventionally associated with fiber ribbons to a more compliant and thus cable space saving configuration. In this way, the ribbons can be carried in cables having smaller diameters, and/or the cables can have a higher fiber density ratio (i.e., fraction of cross-sectional area filled with optical fibers relative to the outer cross-sectional area of the cable). As will be described below, the optical fiber ribbons include a plurality of fiber subunits, which have one or more optical fibers, that are intermittently bonded together along the length of the optical fiber ribbon. The intermittent bonds are applied in such a way that the intermittent bonds do not overlap across the width of the optical fiber ribbon. In order to avoid overlap, the intermittent bonds form a pattern that is based on an irrational number or that forms a triangular or sawtooth pattern. The spacing of intermittent bonds in the patterns is configured to reduce out of plane deflection of the optical fiber ribbon when it is bent about an axis perpendicular to the plane of the fiber array that makes up the ribbon. Each of these exemplary embodiments will be described in greater detail below, and these exemplary embodiments are provided by way of illustration, and not by way of limitation. These and other aspects and advantages will be discussed in relation to the embodiments provided herein.

Figure 1:
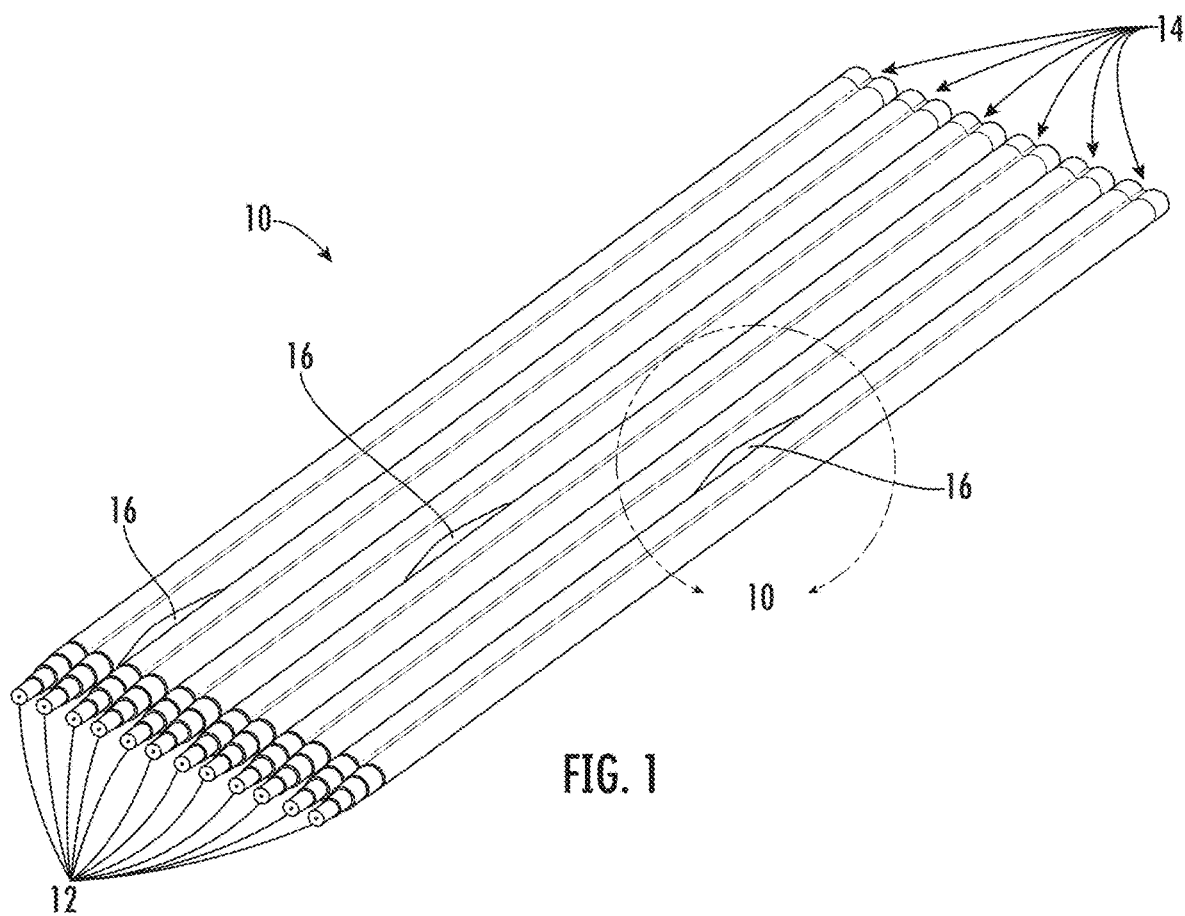
FIG. 1 is partial, perspective view of an intermittently bonded optical fiber ribbon, according to an exemplary embodiment.

FIG. 1 depicts an exemplary embodiment of an optical fiber ribbon 10 according to the present disclosure. The optical fiber ribbon 10 includes a plurality of optical fibers 12. In the embodiment depicted, the optical fiber ribbon 10 includes twelve optical fibers 12. In embodiments, the number of optical fibers 12 contained in the optical fiber ribbon 10 varies from, e.g., four to thirty-six. In certain embodiments, the optical fibers 12 are grouped into subunits 14 having one or more optical fibers 12. In the embodiment shown in FIG. 1, the subunits 14 each include two optical fibers 12. Thus, for example, in the embodiment of FIG. 1, the optical fibers 12 are arranged into six subunits 14. The optical fibers 12 of each subunit 14 are bonded to each other along the length of the optical fiber ribbon 10, but the subunits 14 are only intermittently bonded along the length of the optical fiber ribbon 10.

FIG. 1 depicts the intermittent bonds 16 staggered along the length of the subunits 14. The intermittent bonds 16 between two adjacent subunits 14 may be spaced apart by, e.g., 15 mm to 200 mm. As will be discussed more fully below, the intermittent bonds 16 are applied in a "wet-on-wet" application process, which creates diffusion of the material of the intermittent bond 16 with a coating material of the subunits 14. In embodiments, the optical fiber ribbon 10 has a first configuration in which the optical fibers 12 are arranged in a substantially planar row, which helps to organize the optical fibers 12 for mass fusion splicing. Further, as will be described more fully below, the subunits 14 also can be rolled, curled, or bundled into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the subunits 14 are only held together intermittently along the length of the optical fiber 10 by the intermittent bonds 16.

In a conventional optical fiber ribbon, each optical fiber is bonded to its neighboring optical fiber(s) along the entire length of the optical fiber ribbon to hold them in the planar configuration. According to the present disclosure, however, the fiber subunits 14 are bonded intermittently along the length of the optical fiber ribbon 10 so that the optical fibers 12 are not rigidly held in the planar configuration. In between the intermittent bonds 16, the subunits 14 are not bonded to each other along their length. In this way, the present optical fiber ribbon 10 provides the advantages of a ribbon with respect to fiber organization and mass fusion splicing while also allowing the optical fiber ribbon 10 to curl, roll, or bundle across the width of the ribbon allowing for a more compact cable design.

In order to provide a compact ribbon design, the intermittent bonds 16 are applied between the subunits 14 in such a manner that the intermittent bonds 16 do not overlap across the width of the optical fiber ribbon 10. That is, no two intermittent bonds 16 have the same longitudinal position on the optical fiber ribbon 10. Put differently, each intermittent bond 16 has a unique longitudinal position on the optical fiber ribbon 10 that is not shared by any other intermittent bond 16 along the length of the optical fiber ribbon 10. If the intermittent bonds were to overlap, the material of the bonds would concentrate at locations along the length of the ribbon and thus result in an increase in the rigidity of the optical fiber ribbon across the width at these discrete locations, decreasing the ability of the optical fiber ribbon to curl, fold, or bundle.

FIG. 2A depicts a schematic representation of the intermittent bonding pattern for the optical fiber ribbon 10. In the depiction of FIG. 2A, the lines represent subunits 14 of one or more optical fibers 12 (e.g., two optical fibers 12 as shown in FIG. 1), and individual subunits are referenced as 14-1, 14-2, . . . 14-*n*. In the embodiment shown in FIG. 2A, there are six subunits 14-1, 14-2, 14-3, 14-4, 14-5, 14-6. The regions where one subunit 14 dips to contact an adjacent subunit 14 represent intermittent bonds 16 between the subunits 14. It should be noted that the dips depicted in FIG. 2A are used to illustrate the intermittent bonds 16 and do not indicate that the subunits 14 would actually physically dip at the locations of intermittent bonds 16. In order to describe the intermittent bonding pattern in embodiments, three parameters are utilized. The first parameter "A" refers to the longitudinal distance between intermittent bonds 16 joining a particular pair of subunits 14 (e.g., the longitudinal distance between intermittent bonds 16 joining subunit 14-1 and subunit 14-2). The second parameter "B" refers to the longitudinal offset between the intermittent bonds 16 of adjacent pairs of subunits 14. Thus, for example, second parameter B refers to the offset between the intermittent bond 16 of the subunit pair 14-1, 14-2 and the intermittent bond 16 of the subunit pair 14-2, 14-3. In certain instances, the second parameter B is referred to as a fraction or multiple of the first parameter A. The third parameter "C" refers to the length of each intermittent bond 16. In certain instances, the third parameter C is also referred to as a fraction or multiple of the first parameter A.

The intermittent bonds 16 occur at interfaces between subunits 14. The number of interfaces X is equal to one less than the number (N) of subunits 14 in the optical fiber ribbon 10 (i.e., X=N−1). Thus, for example, an optical fiber ribbon 10 with six subunits 14 will have five interfaces. Particular interfaces may be referenced herein with a slash between the numbered subunits (e.g., the interface between subunit 14-1 and subunit 14-2 may be referenced as "interface 14-1/14-2"). In order to provide an optical fiber ribbon 10 without overlap of intermittent bonds 16, Applicant has found that a direct correlation exists between the divisor of the offset parameter B and the number of interfaces. In particular, no overlap will exist if the offset parameter B is equal to the number of interfaces divided by a divisor that is greater than the number of interfaces. For example, in a six subunit optical fiber ribbon 10, no overlap will exist for an offset parameter B of (5/8)A (i.e., the divisor (8) is greater than the number of interfaces (5)). Additionally, as shown in FIG. 2B, the complement to the fraction (e.g., (3/8)A) will also produce an offset that produces no overlap.

In embodiments, the offset parameter B is equal to a fraction of A close to 0.5 that corresponds to the number of interfaces X divided by a divisor equal to 2(X−1). Thus, in embodiments, the offset parameter B is equal to (X/(2(X−1))A or its complement. For example, the offset parameter B for an optical fiber ribbon 10 having twelve subunits 14 and eleven interfaces may be equal to (11/20)A or (9/20)A.

In still other embodiments, the offset parameter B is based on an irrational number, in particular an irrational number that is close to 0.5, in order to avoid overlapping of the intermittent bonds 16. In a particular embodiment, the offset parameter B is based on the golden ratio $\varphi=(1+\sqrt{5})/2=1.6180339887\ldots$. Specifically, the offset parameter B=A/$\varphi$. FIGS. 3A and 3B show optical fiber ribbons 10 having six subunits 14 and twelve subunits 14, respectively, in which the offset parameter B is A/$\varphi$. As can be seen in FIGS. 3A and 3B, the intermittent bonds 16 do not overlap across the width of the optical fiber ribbon 10, and each intermittent bond 16 has a unique longitudinal position along the length of the optical fiber ribbon 10. In other embodiments, the offset parameter B can be based on such irrational numbers as $\sqrt{2}$, $\sqrt{3}$, $\sqrt{5}$, $\sqrt{7}$, Euler's number, or $\pi$. For example, the offset parameter B may be the first parameter A divided by, e.g., one of the irrational numbers, an integer multiple of one of the irrational numbers, the sum or difference of an integer and one of the irrational numbers, etc.

In further embodiments, the intermittent bonding pattern is a triangular or sawtooth bonding pattern. As shown in FIG. 4A, four parameters are used to define the triangular pattern. In such embodiments, the first parameter A still refers to the longitudinal distance between intermittent bonds 16 joining a particular pair of subunits 14. The second parameter B refers to the offset between an intermittent bond 16 at interface 14-1/14-2 and an intermittent bond 16 at interface 14-2/14-3. In embodiments, the second parameter B is from half the first parameter A to less than the first parameter A (i.e., 0.5A≤B<A). The third parameter C still refers to the length of the intermittent bond. The fourth parameter B' refers to the distance between intermittent bonds 16 at successive odd interfaces (14-1/14-2, 14-3/14-4, . . . ) and at successive even interfaces (14-2/14-3, 14-4/14-5, . . . ). In embodiments, the sign of the fourth parameter B' may be the same for the intermittent bonds 16 at the even interfaces and at the odd interfaces, and in other embodiments, the sign of the fourth parameter B' may be different for the intermittent bonds 16 at the even interfaces and at the odd interfaces.

In embodiments of the triangular bonding pattern shown in FIG. 4A, the second parameter B is set at about A*((X−0.5)/X) in which X is the number of interfaces between subunits 14 of the optical fiber ribbon 10 or one less than the number of subunits 14. Further, in particular embodiments of the triangular bonding pattern, the fourth parameter B' is equal to A/X. In the case of a twelve subunit 14 optical fiber ribbon 10, the second parameter B is equal to about 0.95A (i.e., A(11−0.5)/11), and the fourth parameter B' is about 0.09A (i.e., A/11). Further, in the embodiment of FIG. 4A, the odd and even interfaces are offset in the opposite direction defining the triangular bonding pattern. That is, starting from the first odd interface 14-1/14-2, the subsequent odd interfaces (14-3/14-4, 14-5/14-6, . . . ) are offset to the left, whereas starting from the first even interface 14-2/14-3, the subsequent even interfaces (14-4/14-5, 14-6/14-7, . . . ) are offset to the right.

In the embodiment shown in FIG. 4B, a sawtooth bonding pattern is shown using the same four parameters as the triangular bonding pattern. In a particular embodiment of the sawtooth bonding pattern, the second parameter B is set at about A*((X/2+0.5)/X). The fourth parameter B' is A/X. Besides the difference in the second parameter B, the sawtooth bonding pattern differs from the triangular bonding pattern in that the sign of the fourth parameter B' is the same for the intermittent bonds 16 at the odd and even interfaces. That is, starting from the first odd interface 14-1/14-2, the subsequent odd interfaces (14-3/14-4, 14-5/14-6, . . . ) are offset to the left, and starting from the first even interface 14-2/14-3, the subsequent even interfaces (14-4/14-5, 14-6/14-7, . . . ) are also offset to the left. In both the triangular bonding pattern and the sawtooth bonding pattern, though, there is no overlap of the center of the intermittent bonds 16 across the width of the optical fiber ribbon 10.

Figure 5A:
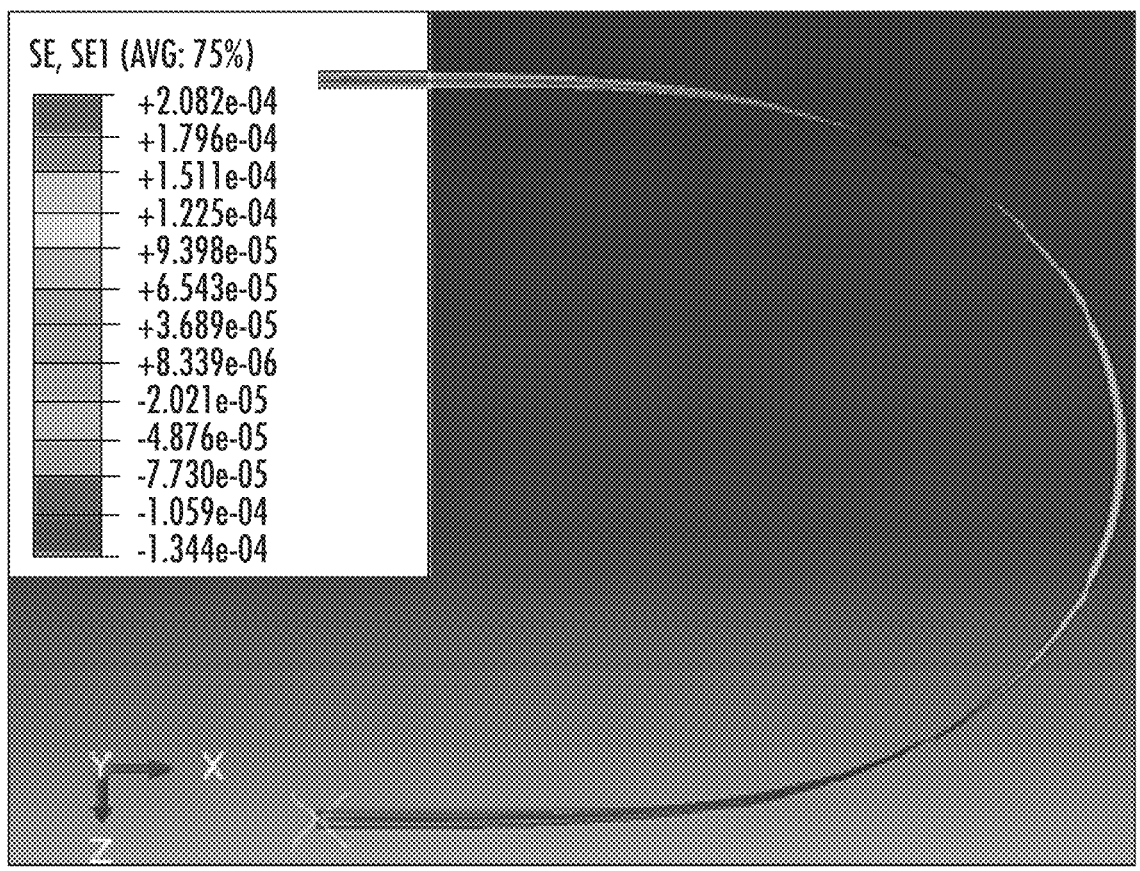
FIGS. 5A and 5B depict global out-of-plane deflection for an optical fiber ribbon bent between two ends.
Figure 5B:
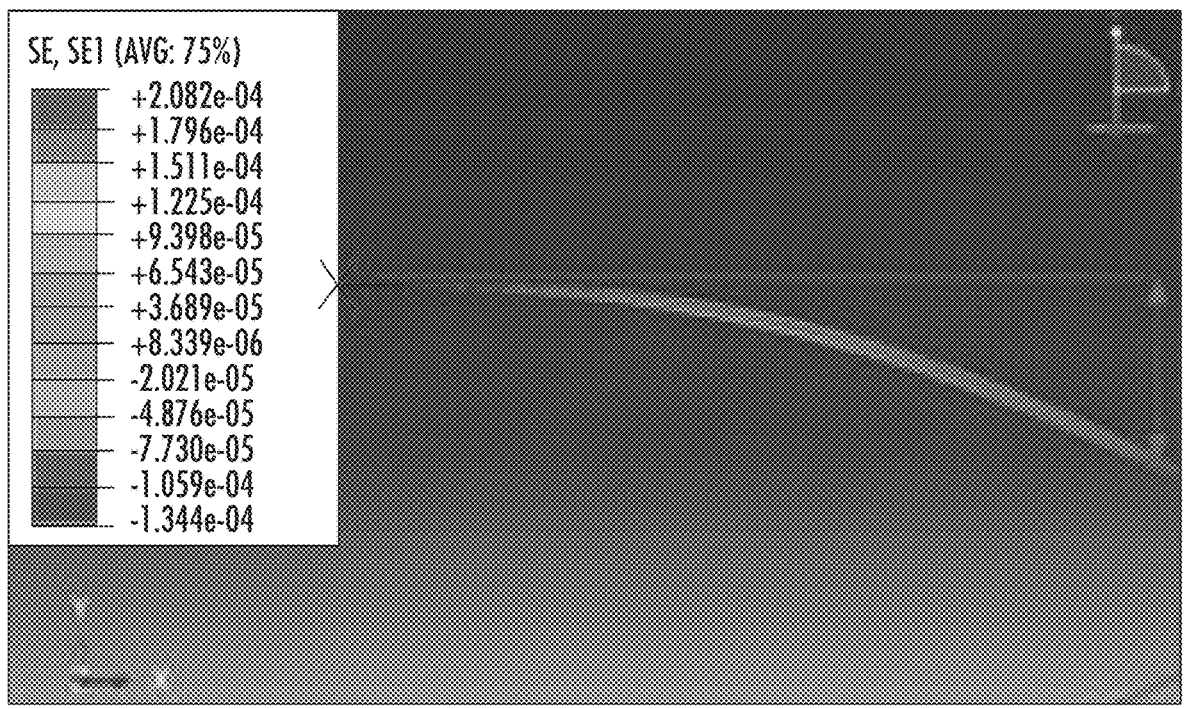

To this point, only the relative positioning of the intermittent bonds 16 has been considered. That is, the offset parameters have been defined in terms of a fraction or multiple of the first parameter A. However, the actual length between the intermittent bonds also contributes to the overall stiffness of the optical fiber ribbon 10 and its ability to bend, curl, or bundle into a compact configuration for placement in an optical fiber cable. In that regard, the global and local deflection of the optical fiber ribbon 10 upon bending was considered. FIG. 5A depicts a U-shaped bend of the optical fiber ribbon. In particular, the two ends of the optical fiber ribbon 10 were held flat in a plane with the optical fiber ribbon 10 curving between the ends. As can be seen in FIG. 5A, the optical fiber ribbon 10 twists to minimize the strain energy within the ribbon between the two ends. The degree of ribbon twist and the subsequent out-of-plane deformation will depend on the stiffness of the optical fiber ribbon 10. A stiffer ribbon 10 will deform to a greater degree. FIG. 5A considers an optical fiber ribbon with subunits bonded along the entire length and bent into a U-shape with the ends of the ribbon held flush to an imaginary plane, i.e., the subunits are not intermittently bonded but are more closely associated with a conventional optical fiber ribbon. As shown in FIG. 5B, the ribbon will globally deflect from this imaginary plane, and a ribbon with subunits bonded along the length will deflect farther out of plane than a ribbon with intermittently bonded subunits. As mentioned previously, the out of plane deformation in the ribbon structure is a result of the minimum strain energy adopted.

Figure 6:
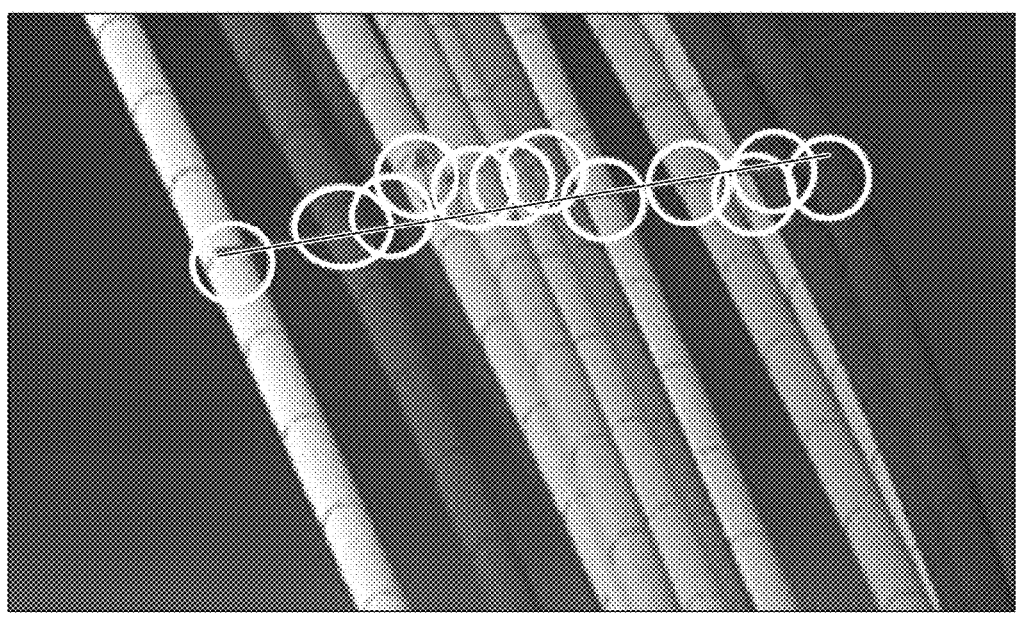
FIG. 6 depicts local out-of-plane deflection for a bent optical fiber ribbon.

Thus, intermittent bonding in general can reduce the stiffness of the optical fiber ribbon, which thereby reduces the structure's internal strain energy and minimizes the global out-of-plane deflection of the optical fiber ribbon. The stiffness can be further decreased by avoiding overlap between the intermittent bonds 16 as disclosed herein, which will further reduce the strain energy and global out-of-plane deflection. However, if the structural integrity is too low, the local out-of-plane deflection of the individual fibers across the ribbon width as shown in FIG. 6 is increased. In particular, FIG. 6 depicts unbonded, loose optical fibers undergoing bending. In such a configuration, loose optical fibers would exhibit minimal internal strain energy and thus minimal global deflection out of the plane. This is in contrast to what is shown in FIG. 5B. However, locally, the fibers or subunits will deflect out of the planar arrangement. At the other extreme of a conventional ribbon with subunits bonded along their entire length, there would be minimal or no local out-of-plane deflection. The intermittently bonded optical fiber ribbon 10 having no overlap between the intermittent bonds 16 according to the present disclosure seeks to balance the global out-of-plane ribbon deflection as shown in FIG. 5B and the local out-of-plane deflection of the fiber/subunit as shown in FIG. 6.

In investigating the balance between the types of deflection, the first parameter A of the longitudinal distance between intermittent bonds 16 of the same subunit 14 pairs and the third parameter C of the bond width were considered. Applicant found that the first parameter A had the greatest impact on the global and local out-of-plane deflection. In particular, Applicant found that a spacing of 15 mm to 200 mm, in particular 30 mm to 150 mm, and most particularly 70 mm to 80 mm, provided a desirable balance between global and local out-of-plane deflection.

Figure 7A:
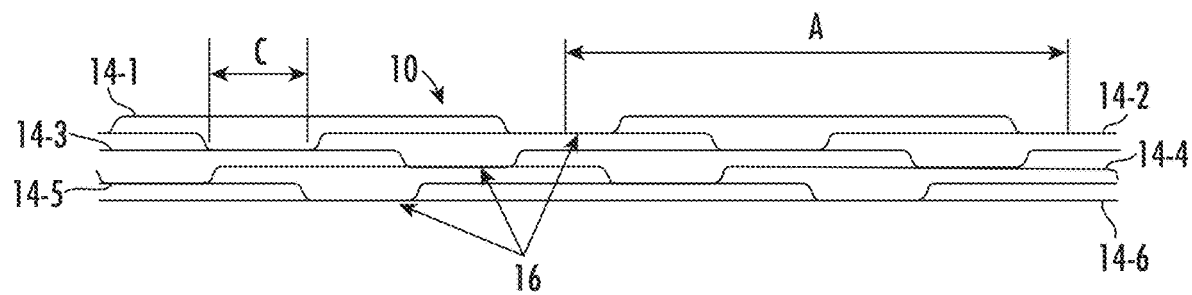
FIGS. 7A-7C depict maximum intermittent bond lengths for triangular and sawtooth intermittent bonding patterns for six, twelve, and sixteen optical fiber subunits, according to exemplary embodiments.
Figure 7B:
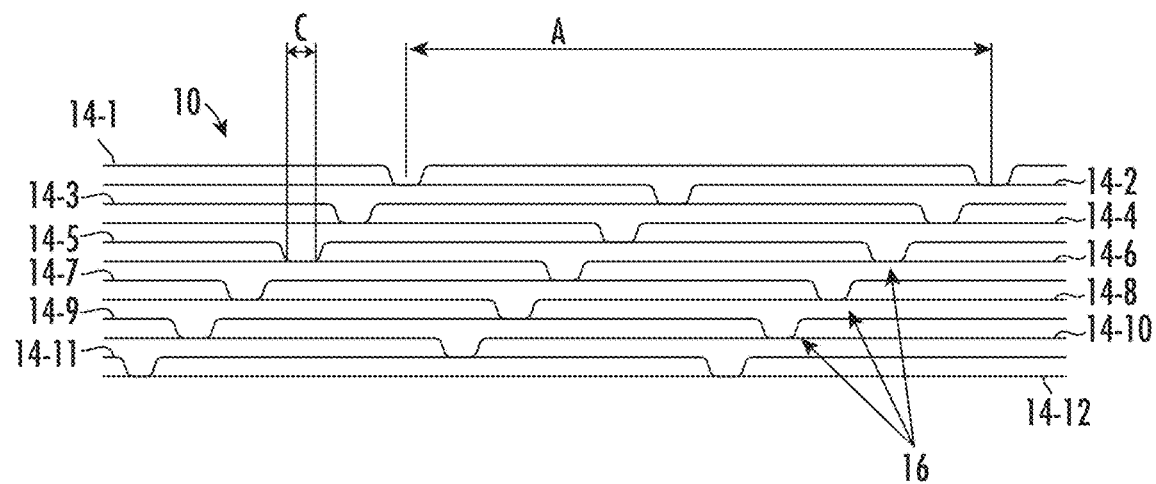
Figure 7C:
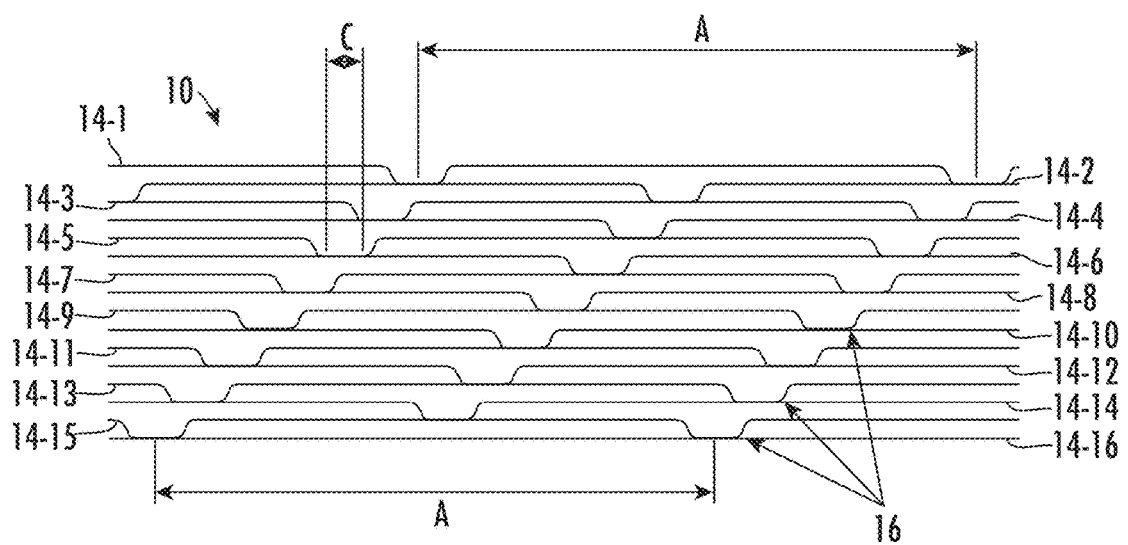

While it was determined that the spacing of parameter A was the dominant factor with respect to local and global out-of-plane deflection, optimal intermittent bond 16 lengths were also determined. FIG. 7A depicts an optical fiber ribbon 10 with six subunits 14 in the triangular or sawtooth pattern. Parameters A and C are depicted. As mentioned, parameter A is selected to be 15 mm to 200 mm. Parameter C, relating to the bond length, was determined to have a maximum dimension of 0.2A for the six subunit 14 embodiment FIG. 7B depicts an optical fiber ribbon 10 with twelve subunits 14 having the triangular or sawtooth pattern. For this embodiment, parameter C was determined to have a maximum dimension of 0.091A. FIG. 7C depicts an optical fiber ribbon 10 with sixteen subunits 14 having the triangular or sawtooth pattern. For this embodiment, parameter C was determined to have a maximum dimension of 0.067A.

Figure 8A:
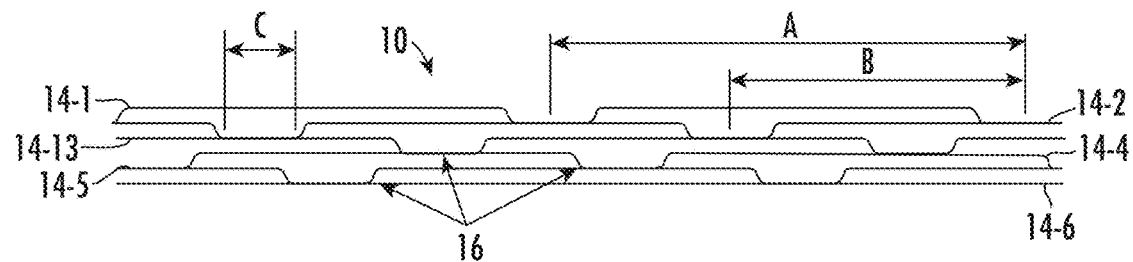
FIGS. 8A-8C depict maximum intermittent bond lengths for the intermittent bonding pattern based on an irrational number for six, twelve, and sixteen optical fiber subunits, according to exemplary embodiments.
Figure 8B:
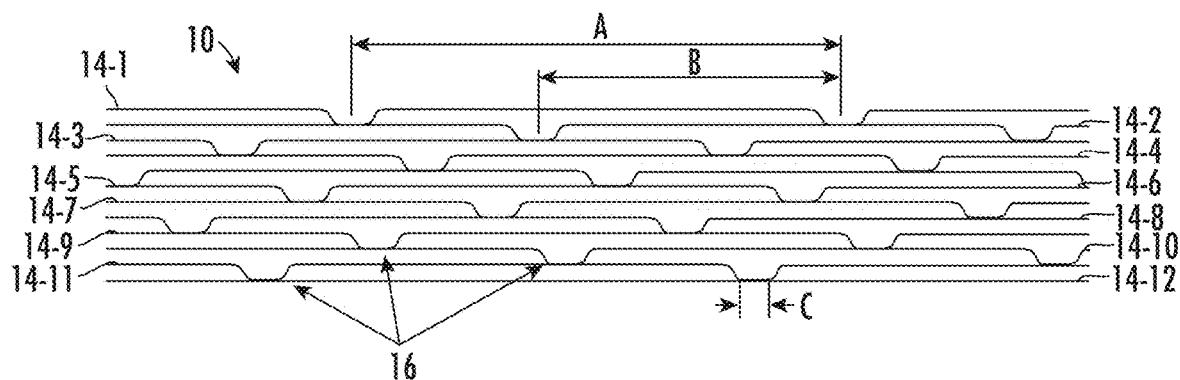
Figure 8C:
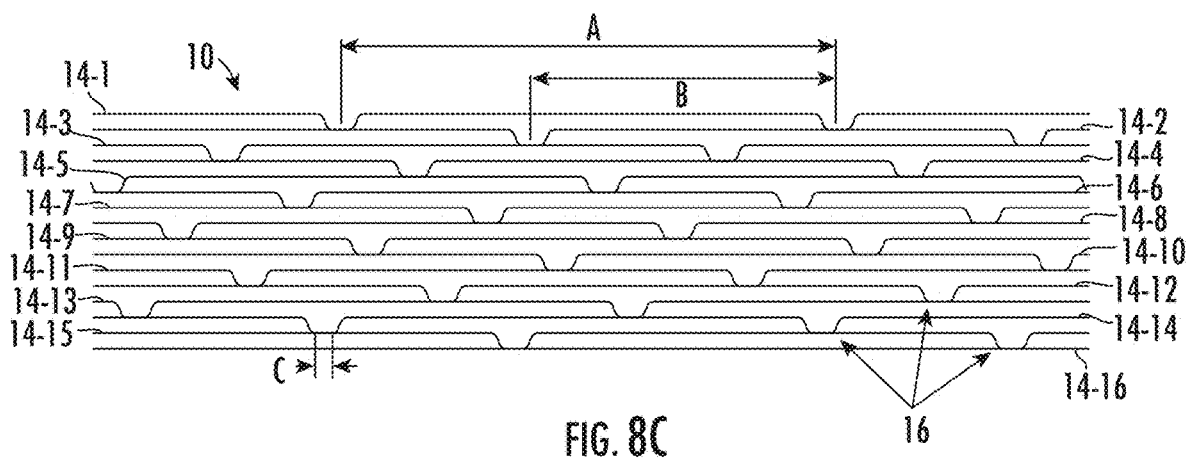

FIG. 8A depicts an optical fiber cable 10 with six subunits 14 having a bonding pattern based on an irrational number, in particular the golden ratio. Parameters A and C are depicted. As mentioned, parameter A is selected to be 15 mm to 200 mm. Parameter C, relating to the bond length, was determined to have a maximum dimension of 0.15A. FIG. 8B depicts an optical fiber cable 10 with twelve subunits 14 having a bonding pattern based on the golden ratio. Parameter C was determined to have a maximum dimension of 0.056A. FIG. 8C depicts an optical fiber cable 10 with sixteen subunits 14 having a bonding pattern based on the golden ratio. Parameter C was determined to have a maximum dimension of 0.034A.

Thus, using the intermittent bonding patterns described herein, overlap between intermittent bonds 16 of the subunits 14 across the width of the optical fiber ribbon 10 can be avoided, which improves flexibility and allows for the optical fiber ribbon to assume a compact cross-section for placement in an optical fiber cable.

Figure 9:
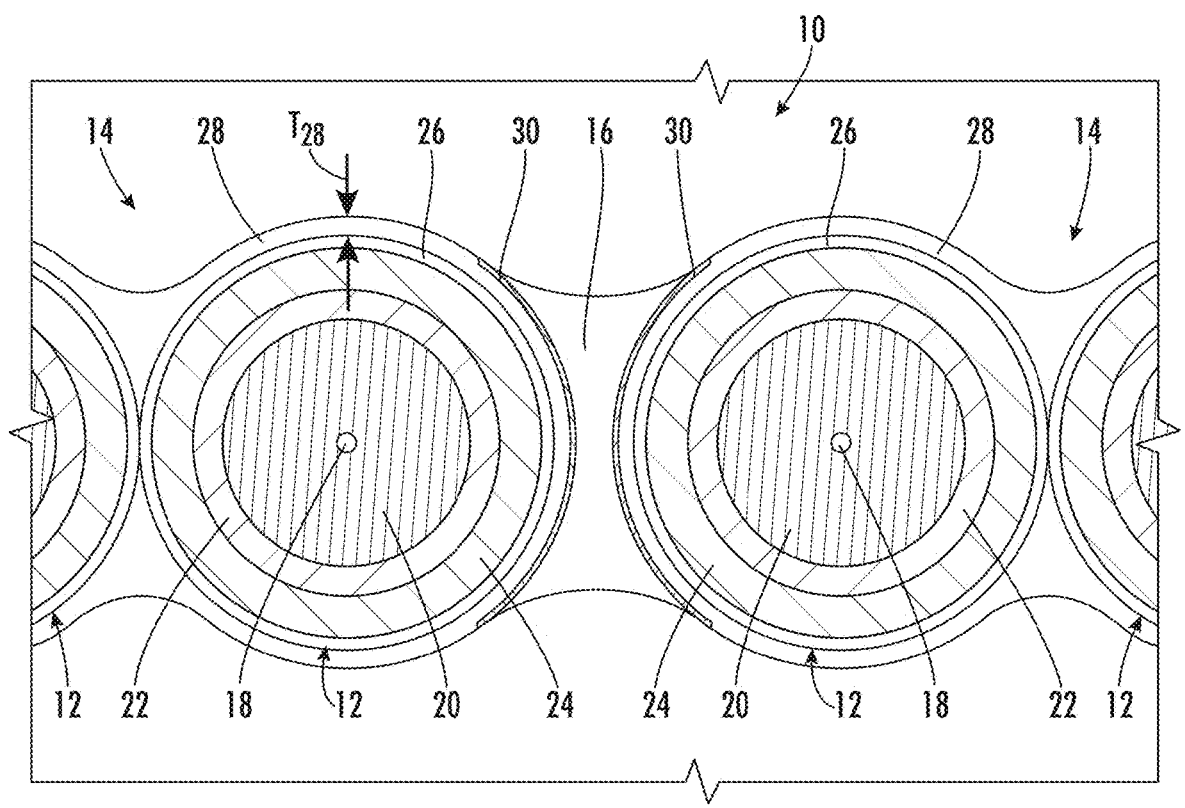
FIG. 9 depicts a partial cross-sectional view of a bond between two optical fiber subunits of the intermittently bonded optical fiber ribbon, according to another exemplary embodiment.

FIG. 9 depicts a cross-section of an intermittent bond 16 between subunits 14. As can be seen in the cross-section of FIG. 9, each optical fiber 12 includes a core 18 arranged substantially at the center of the optical fiber 12. Surrounding the core 18 is a cladding 20. An optical signal travels along the core 18 through internal reflection from the cladding 20. In embodiments, the cladding 20 is surrounded by a primary coating 22, which in turn may be surrounded by a secondary coating 24. The primary coating 22 and secondary coating 24 protect the core 18 and cladding 20. Further, in embodiments, the secondary coating 24 is surrounded by a color layer 26. The color layer 26 may be used to arrange the optical fibers 12 in a color-coded pattern. For example, one convention for color-coding the optical fibers 12 is to arrange them in the following color sequence: blue, orange, green, brown, slate, white, red, black, yellow, violet, rose, and aqua (going from upper left to lower right with respect to the orientation of FIG. 1). In embodiments containing more than twelve optical fibers 12, the pattern of colors may be repeated. The optical fibers 12 are color coded in this way to help organize and identify specific fibers 12 when making connections or splices.

As can be seen in FIG. 9, the optical fibers 12 of each subunit 14 are connected by a subunit coating 28. The subunit coating 28 joins the optical fibers 12 of each subunit 14 along their length. In embodiments, the optical fibers 12 in each subunit 14 may be touching or separated by a space of no more than one and a half times the diameter of the optical fibers 12 within the ribbon 10. Further, in embodiments, a gap between adjacent subunits 14 may be from 5 μm to 100 μm. At various intervals along the length of the optical fiber ribbon 10, intermittent bonds 16 are disposed in the gap between adjacent subunits 14. The intermittent bond 16 is applied prior to curing of the subunit coating 28, and the intermittent bond 16 and subunit coating 28 are cured together. As such, the intermittent bond 16 material and the subunit coating 28 material are both wet, i.e., uncured, when the intermittent bond 16 material is applied to the optical fiber ribbon 10. As shown in FIG. 9, this "wet-on-wet"

application produces a diffusion zone 30 of the material of the intermittent bond 16 into the material of the subunit coating 28, and vice versa.

Outside of the diffusion zone 30, the material of the intermittent bond 16 has first properties, and the material of the subunit coating 28 has second properties. Within the diffusion zone 30, a gradient between the first properties and the second properties exists. In embodiments, the gradient of properties includes at least one of color, Young's modulus, surface friction, ultimate tear strength, or elongation at break, among others. Thus, for example, the material of the intermittent bond 16 may have a first Young's modulus, and the material of the subunit coating 28 may have a second Young's modulus that is greater than the first Young's modulus. In the diffusion zone 30, the Young's modulus will decrease from the second Young's modulus in a region of the subunit coating 28 just outside of the diffusion zone 30 to the first Young's modulus in a region of the intermittent bond 16 just outside of the diffusion zone 30. In embodiments, the gradient of the property in the diffusion zone 30 may be linear, exponential, geometric, etc. In embodiments, the diffusion zone 30 has a thickness of 2 µm to 50 µm, in particular, 5 µm to 15 µm.

In embodiments, formation of the diffusion zone 30 is facilitated by using miscible resins for the intermittent bond 16 material and the subunit coating 28 material. By using miscible resins, the material of the intermittent bond 16 will more readily mix with the material of the subunit coating 28. Further, besides miscibility, a relatively thicker diffusion zone 30 can be created using other material properties, such as reduced coating viscosities, to promote intermixing of the intermittent bond 16 and subunit coating 28 materials. In embodiments, the resin of the intermittent bond 16 may be immiscible in the resin of the subunit coating 28 but is at least not insoluble in the resin of the subunit coating 28, and in certain embodiments, the resin of the intermittent bond 16 is at least slightly soluble in the resin of the subunit coating 28. In embodiments, the diffusion zone 30 may also be characterized as providing a region of molecular entanglement between the material of the intermittent bond 16 and the material of the subunit coating 28. For example, the diffusion zone 30 may provide an interface between the intermittent bond 16 and subunit coating 28 in which a mechanical bond is created, e.g., as a result of microscopic mechanical surface undulations of the intermittent bond 16 and subunit coating 28.

Because the material of the intermittent bonds 16 mixes or entangles with the material of the subunit coating 28, significant adhesive/cohesive strength is provided at the location of the intermittent bond 16. During separation of the optical fibers 12 or subunits 14, any failure will either occur within one of the materials (depending on the cross-sectional area and cohesive strength of the material) or at an interface between the subunit coating 28 and the color layer 26.

The diffusion zone 30 distinguishes the presently disclosed intermittently bonded optical fiber ribbon 10 from other optical fiber ribbons that utilize "wet-on-dry" deposition techniques. In wet-on-dry deposition techniques, the coating layer to which the bonding material is applied is at least partially cured or fully cured. In this way, the "wet" bonding material does not have a chance to diffuse into or mix/entangle with the "dry" coating material to create a diffusion zone having a gradient of properties between those of the bonding material and those of the coating material.

Figure 10:
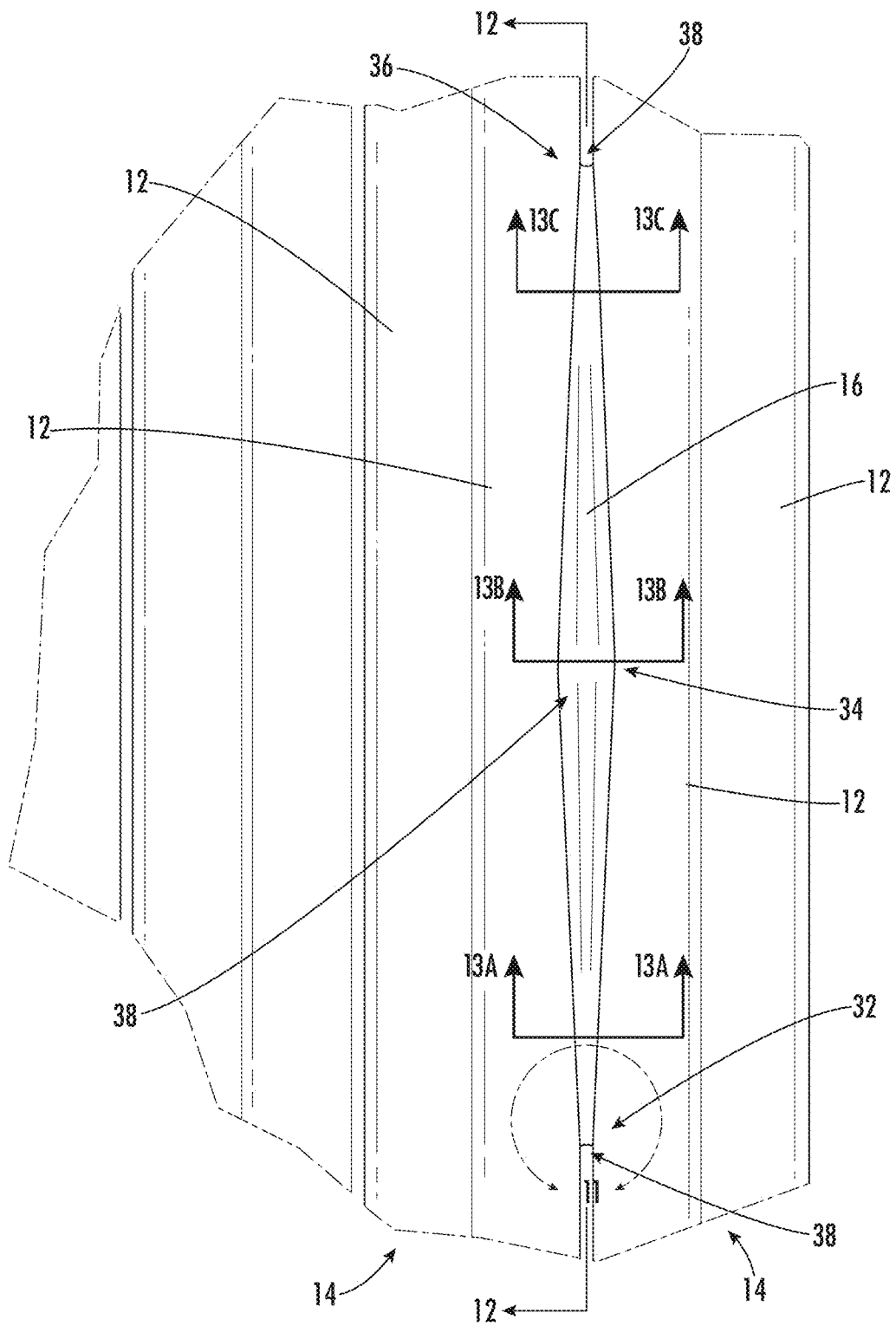
FIG. 10 depicts a top view of an intermittent bond of the optical fiber ribbon, according to an exemplary embodiment.

Further, using the presently disclosed "wet-on-wet" process, the shape of the intermittent bond 16 also distinguishes the optical fiber ribbon 10 from other conventional optical fiber ribbons. Referring now to FIG. 10, a top view of an intermittent bond 16 between subunits 14 is shown. The top and bottom of the intermittent bond 16 has a generally diamond-shaped outline in which a narrow first end 32 of the intermittent bond 16 widens to a maximum width in a central region 34 of the intermittent bond 16 and narrows again at a second end 36. The intermittent bond thickness at the minimum distance between the subunits, however, maintains a constant thickness and thus a constant distance between the two subunits. Further, the surface geometry of the intermittent bond 16 includes a plurality of saddle points 38. As used herein, a "saddle point" refers to an intersection point of two convex and concave curves where each curve is defined by a plane that has a normal vector parallel to the surface of the bond feature. The saddle point is defined by the intersection of the curves where the plane that defines the convex curve and the plane that defines the concave curve are orthogonal. Both of these orthogonal planes are parallel to a reference plane of the ribbon. In such an instance, the saddle point is where the slopes in orthogonal directions are all zero, e.g., where a relative minimum and a relative maximum intersect at orthogonal planes. In embodiments, the intermittent bond 16 includes saddle points 38 located at the first end 32, the second end 36, or both the first end 32 and the second end 36. In embodiments, a saddle point is also located at the top and bottom surfaces of the bond located at the central region 34.

Figure 11:
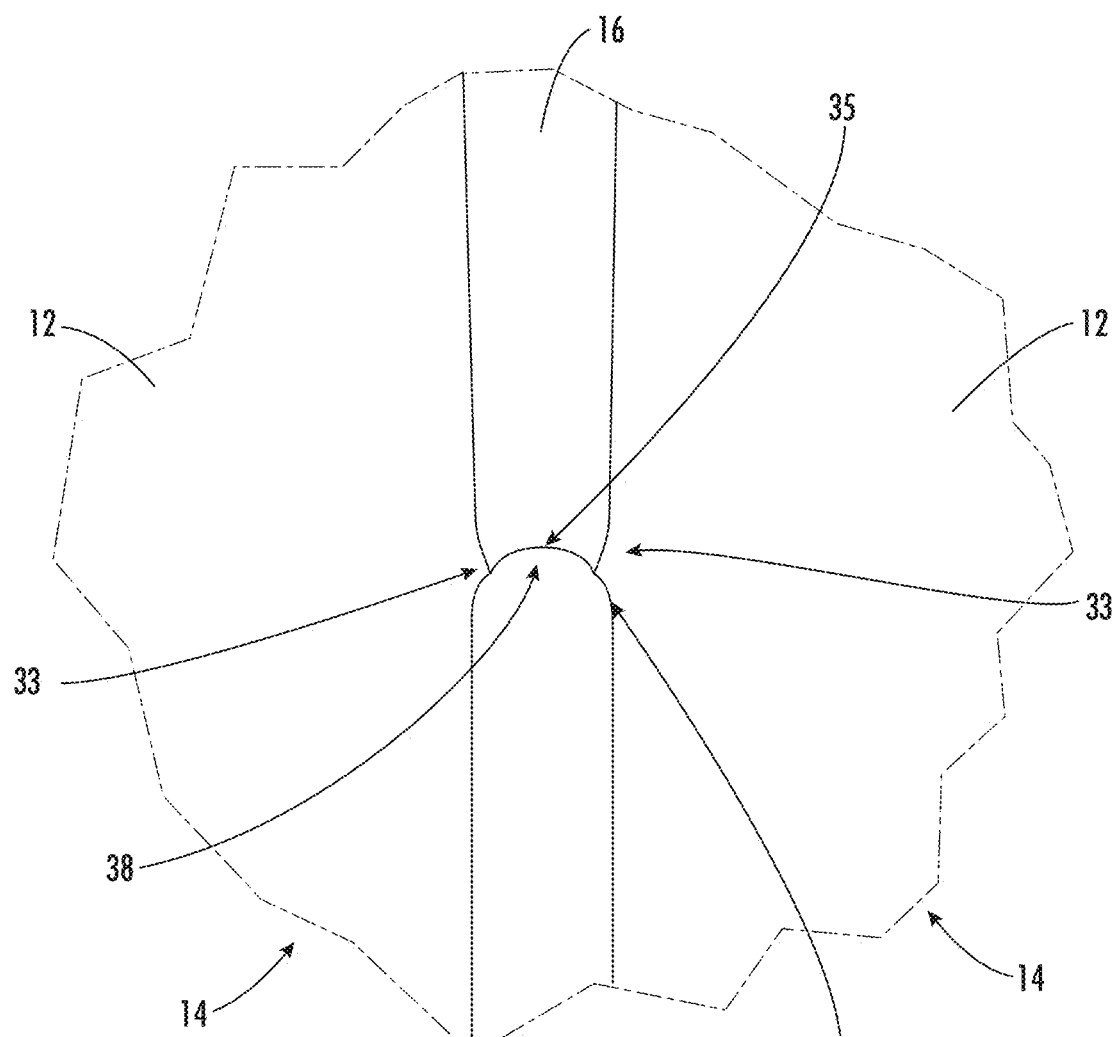
FIG. 11 depicts a saddle surface at an end of the intermittent bond, according to an exemplary embodiment.

As can be seen in the detail view of FIG. 11, the first end 32 has a concave curvature in which the edge portions 33 (of the material surrounding the fibers) adjacent the optical fibers 12 extend past the middle portion 35 and perhaps bridge the gap between the fibers. However, in the longitudinal cross-sectional view of FIG. 12, it can be seen that a portion of the matrix surrounding the fibers is drawn into the region between the fibers by the bond matrix material as a result of surface tension effects. This combination of matrix materials results in a first (upper) surface 40 and a second (lower) surface 42 to define a concave curvature.

Figure 12:
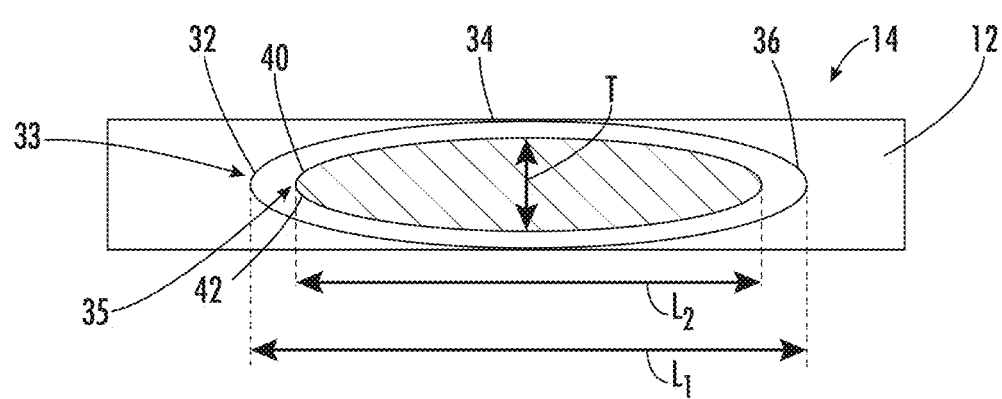
FIG. 12 depicts a cross-sectional view of the intermittent bond along the length of the intermittent bond, according to a further exemplary embodiment.

From the longitudinal cross-sectional view shown in FIG. 12, it can be seen that a longitudinal plane oriented perpendicular to the ribbon plane and equidistant between any two subunits the first line 40 and the second line 42 define a changing thickness T along the length of the intermittent bond 16. The thickness T in the middle portion 35 increases moving from the first end 32 to the central region 34, and the thickness T decreases moving from the central region 34 to the second end 36. In this way, the first surface 40 and the second surface 42 each define convex curvatures extending longitudinally along the length of the intermittent bond 16. However, as shown in the lateral cross-sections of FIGS. 13A-13C, the first surface 40 and the second surface 42 also define concave curvatures extending laterally across the width of the intermittent bond 16.

Figure 13A:
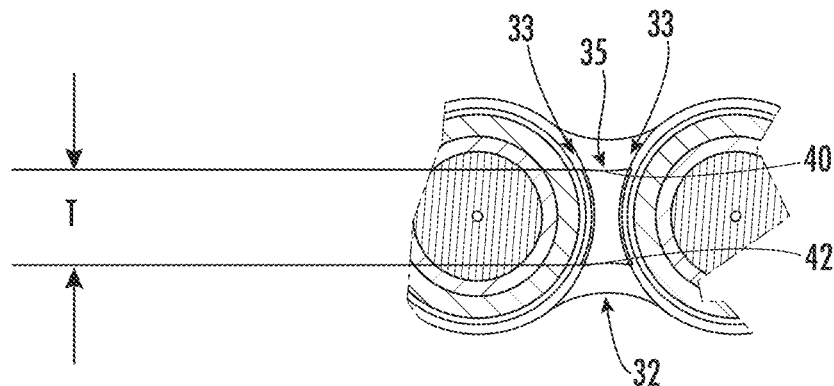
FIGS. 13A-13C depict cross-sectional views of the intermittent bond across the width of the intermittent bond, according to an exemplary embodiment.
Figure 13B:
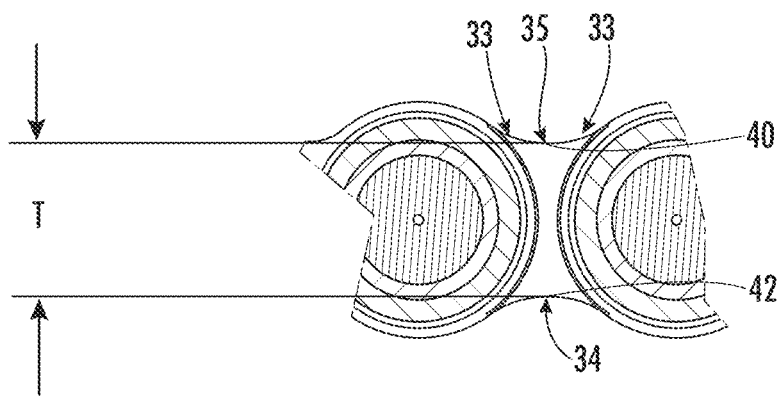
Figure 13C:
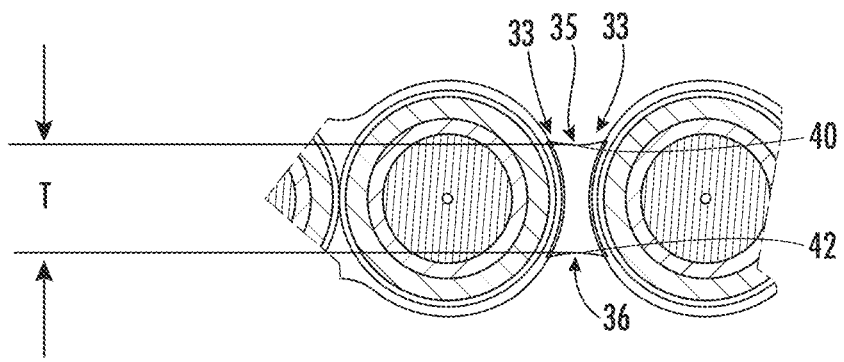

Referring first to FIG. 13A, a lateral cross-section taken proximal to the first end 32 is depicted. As can be seen, the edge portions 33 adjacent the optical fiber 12 on the first surface 40 are higher than the middle portion 35, and the edge portions 33 adjacent the optical fiber 12 on the second surface 42 are lower than the middle portion 35. FIG. 13B depicts a lateral cross-section taken at the central region 34. In comparison to FIG. 13A, the thickness T of the intermittent bond 16 is increased in the cross-section of FIG. 13B, further demonstrating the longitudinal convex curvature. Additionally, in FIG. 13B, the edge portions 33 adjacent the optical fibers 12 are higher and lower than the middle portions 35 of the first surface 40 and second surface 42, respectively. Thus, the lateral cross-section demonstrates a concave curvature across the width of the intermittent bond 16. In FIG. 13C, a lateral cross-section taken proximal to the second end 36 is depicted. Again, it can be seen that the edge portions 33 adjacent the optical fiber 12 are higher and lower than the middle portions 35 of the first surface 40 and second surface 42, respectively.

Accordingly, in embodiments, the intermittent bond 16 can be described as having a variable longitudinal thickness in which a minimum longitudinal thickness is located at longitudinal ends 32, 36 of the intermittent bond 16 and a maximum longitudinal thickness is located proximal to a midpoint in the central region 34 between the longitudinal ends 32, 36 of the intermittent bond 16. Further, the variable thickness profile of the intermittent bond 16 may be described as a thin/thick/thin profile in which the surfaces 40, 42 will be concave in shape at every point about a plane bisecting the intermittent bond 16 in the lengthwise (i.e., longitudinal) direction.

Further, in embodiments and with reference to FIG. 12, the intermittent bond 16 can be described as having a maximum longitudinal length $L_1$ at edge portions 33 proximal to the optical fibers 12 of the subunits and a minimum longitudinal length $L_2$ at a middle portion 35 between the edge portions 33. Further, in embodiments and with reference to FIG. 10, the intermittent bond 16 can be described as having a minimum lateral width at the longitudinal ends 32, 36 of the intermittent bond 16 and a maximum lateral width in the central region 34 between the longitudinal ends 32, 36 of the intermittent bond 16.

Figure 14:
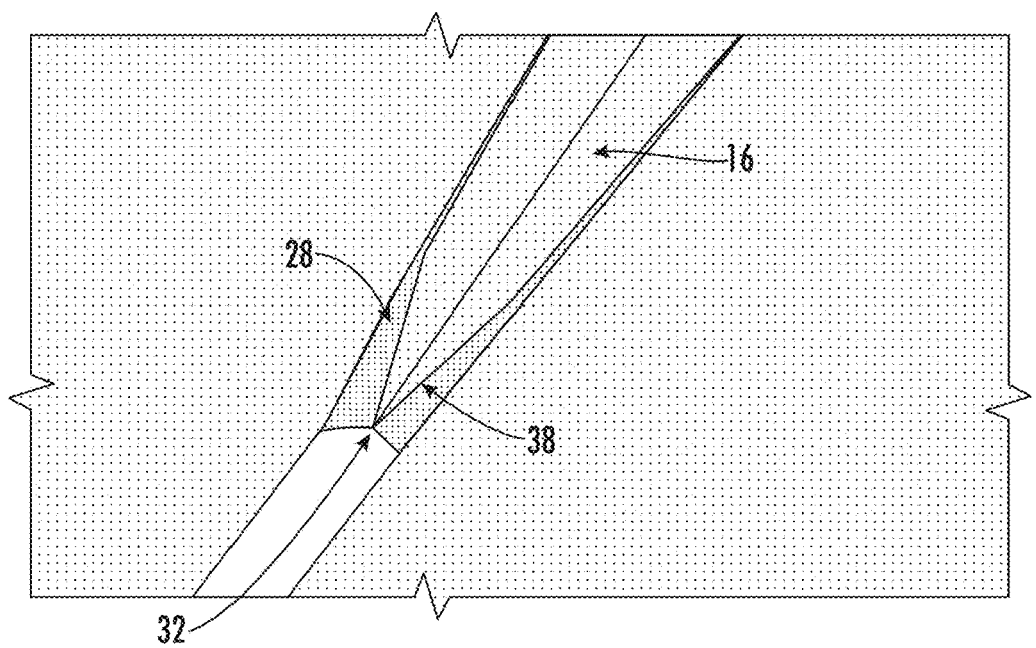
FIG. 14 depicts resin of the subunit coating drawn into a saddle surface at an end of the intermittent bond, according to an exemplary embodiment.

Because of the wet-on-wet application process, the material of the subunit coating 28 is drawn into the intermittent bond 16 at the ends 32, 36 as shown in FIG. 14. In particular, besides the diffusion zone 30 created at the interface between the intermittent bond 16 and the subunit coating 28, the subunit coating 28 is drawn into the gap between the subunits 28, enhancing mixing at the saddle surfaces 38 at the ends 32, 36. This is illustrated in FIG. 14 by the use of the first weight of stippling in the intermittent bond 16 and subunit coating 28 materials, and a heavier weight of stippling in the region where the subunit coating 28 material is drawn into the intermittent bond 16 material.

Figure 15:
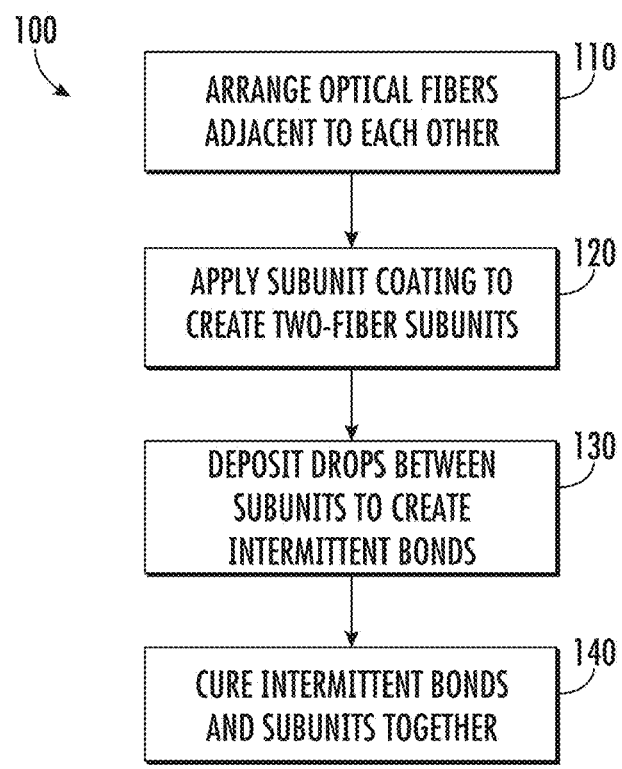
FIG. 15 is a flow diagram describing a method of preparing an optical fiber ribbon, according to an exemplary embodiment.

FIG. 15 depicts a process flow diagram for a method 100 for preparing an optical fiber ribbon 10 according to the present disclosure. In a first step 110, the optical fibers 12 are arranged adjacent to each other. For the purposes of processing and deposition of the subunit coating 28 and intermittent bonds 16, the optical fibers 12 may be arranged in a planar fashion. In a second step 120, the optical fibers 12 are moved through a continuous applicator that applies the material for the subunit coating 28. The material for the subunit coating 28 is applied in a manner that joins sets of at least two optical fibers 12 into fiber subunits 14.

In an embodiment, the material for the coating 16 is a curable formulation (e.g., UV-curable formulation) comprising one or more urethane acrylate oligomers, one or more epoxy acrylate oligomers, one or more acrylate monomers, one or more photoinitiators, an antioxidant, and/or other typical processing additives. Further, in embodiments, the material for the subunit coating 28 has a Young's modulus of from 25 MPa to 1300 MPa, an elongation at break of from 10% to 200%, a specific gravity of 0.9 to 1.2, a tensile strength of 10 MPa to 40 MPa, and/or a viscosity in the range from 100 cP to 8000 cP at 25° C. Additionally, in embodiments, the material for the intermittent bonds 16 has a glass transition temperature of from 30° C. to 100° C.

The subunit coating 28 is applied in a continuous manner so as to provide a lengthwise continuous coating 28 for the two (or more) optical fibers 12 in the subunit 14. Referring back to FIG. 9, it can be seen that the subunit coating 28 has a variable thickness around the optical fibers 12. In embodiments, the subunit coating 28 is applied in such a way that the subunit coating 28 has a minimum thickness $T_{28}$ (as shown in FIG. 9) of 2 μm to 20 μm. The minimum thickness $T_{28}$ will generally be located at or proximal to the positions around the optical fiber 12 normal to a plane defined by the adjacent optical fibers 12 of the subunit 14.

Before curing the subunit coating 28, the intermittent bonds 16 are deposited between the subunits 14 in a third step 130. In embodiments, the material of the intermittent bonds 16 is applied in a dropwise fashion. In particular, the intermittent bonds 16 may be deposited using a discrete coating applicator that ejects a droplet of liquid material for the intermittent bonds 16 onto the uncured and still wet subunit coating 28. As mentioned above, the subunits 14 are spaced such that a gap of 5 μm to 100 μm is provided between the subunits 14, and the intermittent bond 16 bridges the gap between the subunits 14. The shape of the intermittent bond 16 can be influenced by the viscosity of the material deposited, e.g., a lower viscosity can enhance mixing and increase the thickness of the diffusion zone and also cause more spread of the droplet. Thus, in embodiments, the discrete coating applicator may operate in conjunction with a heating element to adjust the viscosity to influence the shape of the intermittent bonds 16. Additionally, the discrete coating applicator may be adjusted to vary the volume of the droplet to increase or decrease the length or width of the intermittent bond 16. In embodiments, manipulating the volume, length and/or width of the intermittent bond 16 can affect the tear strength required to disrupt the intermittent bonds 16, e.g., when installing the optical fiber ribbon 10.

Figure 16:
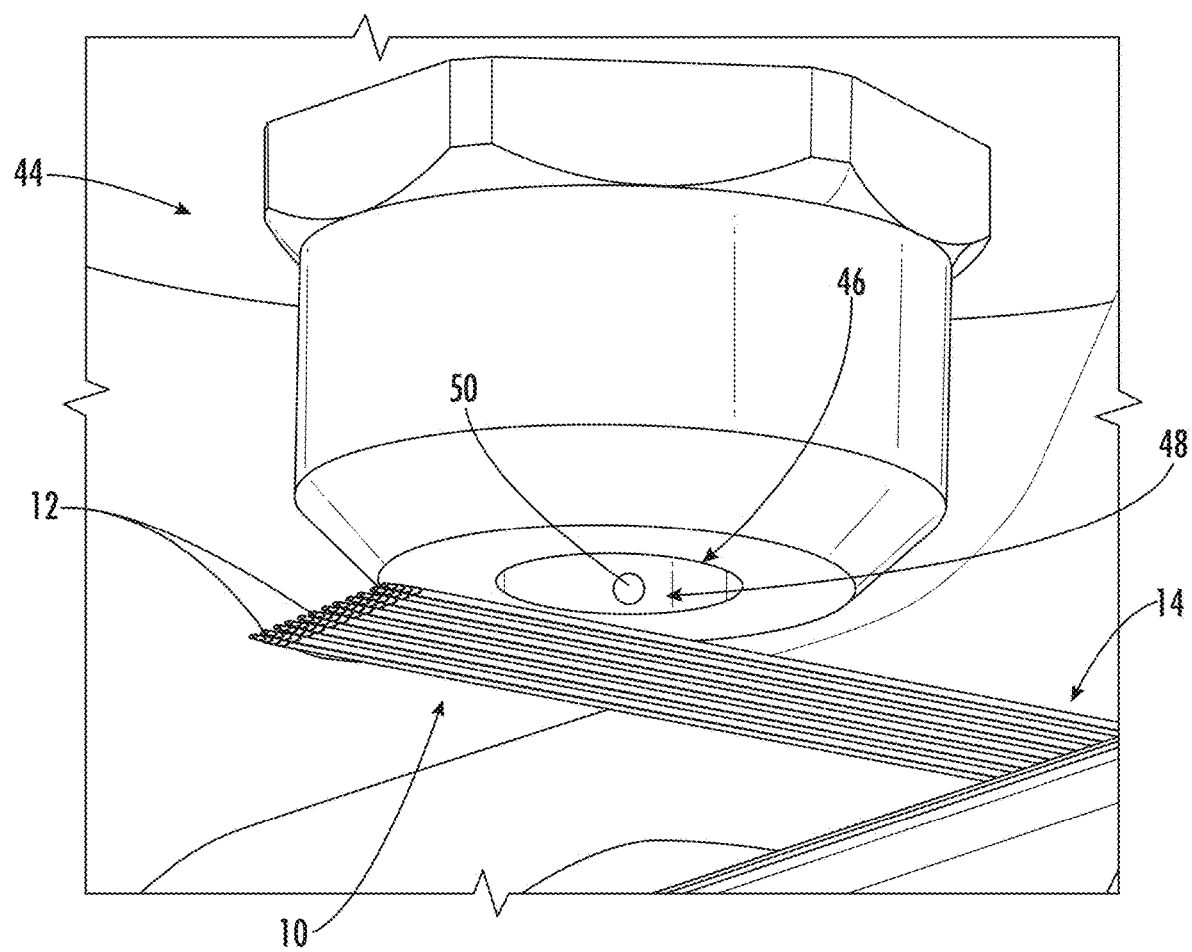
FIG. 16 depicts a discrete coating applicator configured to deposit the intermittent bonds, according to an exemplary embodiment.

FIG. 16 depicts an embodiment of a discrete coating applicator 44. The applicator 44 includes a nozzle 46 having an aperture 48 through which a droplet 50 of intermittent bond 16 material is ejected. The droplet 50 may be ejected using a plunger actuated by a controller. In embodiments, the applicator 44 may move across the width of the ribbon 10 to deposit each intermittent bond 16. In other embodiments, a plurality of applicators 44 may be provided to deposit droplets 50 between specific subunits 14. For example, an optical fiber ribbon 10 having twelve optical fibers 12 will have six two fiber subunits 14 having five gaps between the subunits 14 to be filled with droplets 50 to form the intermittent bonds 16. Thus, five applicators 44 may be provided across the width of the optical fiber ribbon 10 to deposit the intermittent bonds 16. In practice, the optical fibers 12 will be moving along a processing line, and the applicator 44 or applicators 44 will be located at a station on the processing line. Thus, the applicator(s) 44 will apply droplets 50 on moving optical fibers 12.

In an embodiment, the material of the intermittent bonds 16 is a curable formulation (e.g., UV-curable formulation) comprising one or more urethane acrylate oligomers, one or more epoxy acrylate oligomers, one or more acrylate monomers, one or more photoinitiators, an antioxidant, and/or other typical processing additives. Further, in embodiments, the material for the intermittent bonds 16 has a Young's modulus of from 25 MPa to 1300 MPa, an elongation at break of from 100% to 200%, a specific gravity of 0.9 to 1.2, a tensile strength of 10 MPa to 40 MPa, and/or a viscosity in the range from 100 cP to 8000 cP at 25° C. Additionally, in embodiments, the material for the intermittent bonds 16 has a glass transition temperature of from 20° C. to 100° C.

Returning to FIG. 15, in a fourth step 140, the subunit coating 28 and intermittent bond 16 are cured together. In embodiments, curing can involve application of various forms of radiation, such as ultraviolet (UV) light, visible light, infrared (IR) radiation. Additionally, curing can involve application of heat or water vapor. As with the applicators 44, the optical fibers 12 will generally be moving along a processing line, and thus, the curing make take place, e.g., within a chamber that is another station along the processing line downstream from the applicator 44 station.

Figure 17:
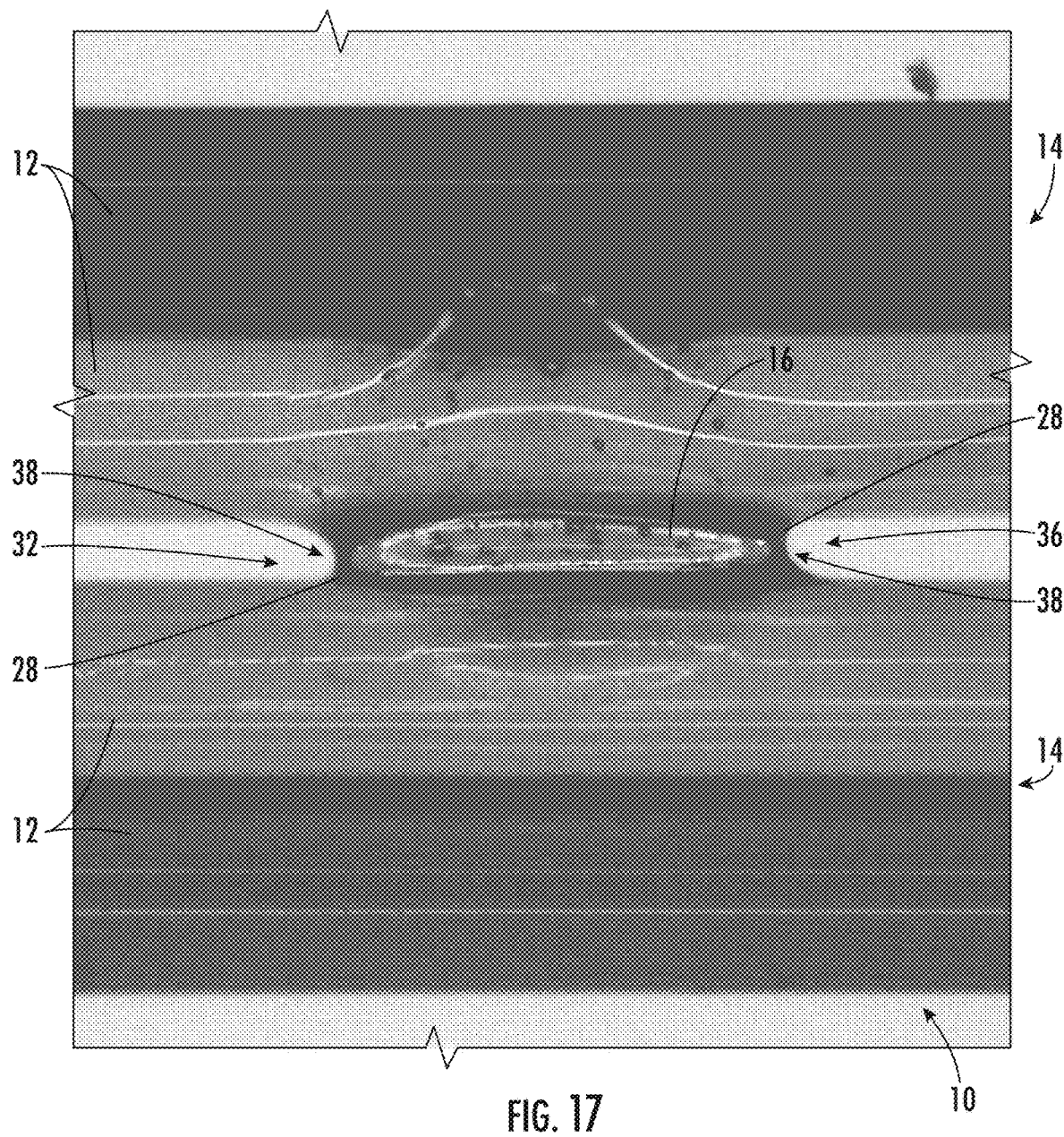
FIG. 17 depicts an intermittent bond deposited between subunits, according to an exemplary embodiment.
Figure 18:
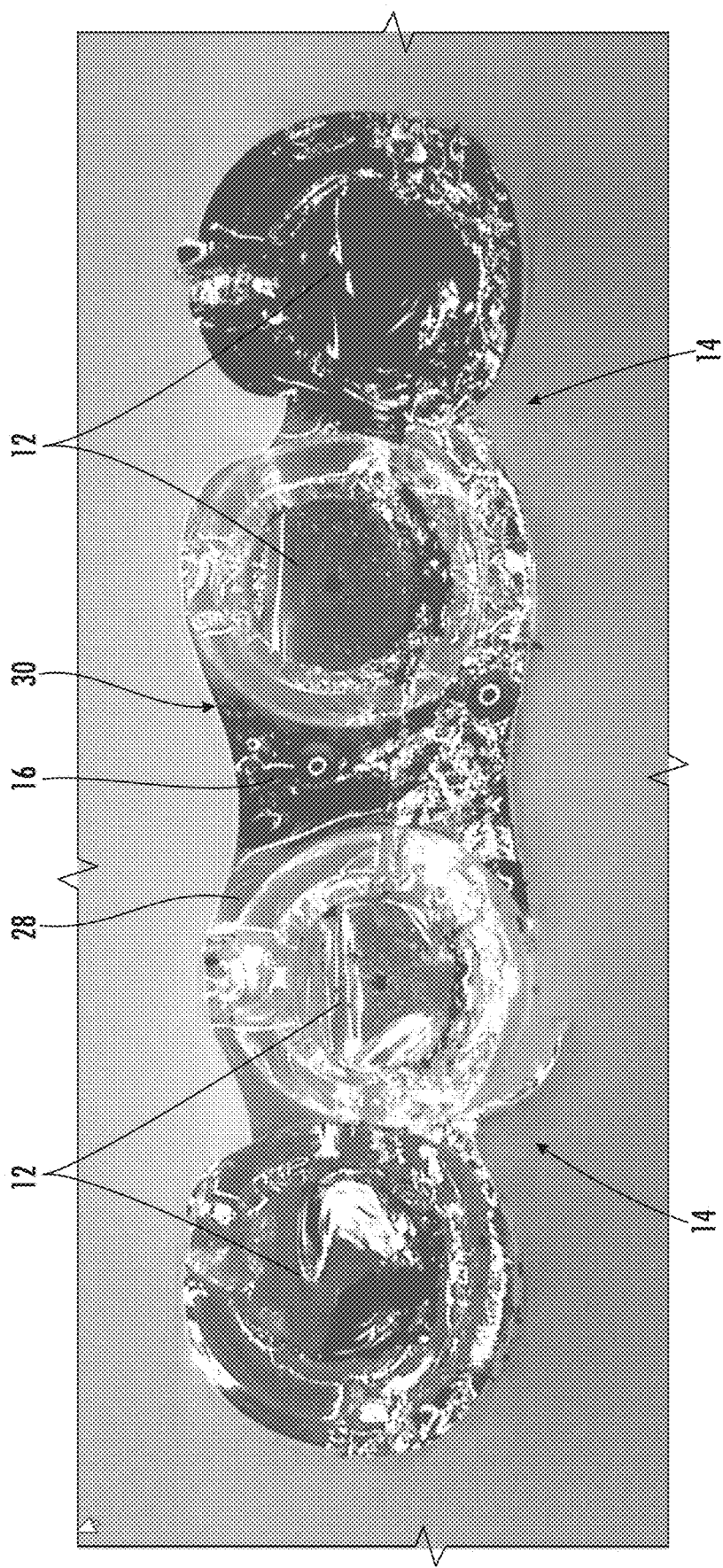
FIG. 18 depicts a cross-section of the intermittent bond of FIG. 17.

FIG. 17 depicts an intermittent bond 16 between adjacent subunits 14 of an optical fiber ribbon 10 prepared using the method 100 described above. The saddle surfaces 38 can be seen at the ends 32, 36 of the intermittent bond 16. Further, it can be seen in FIG. 17 that the subunit coating 28 is drawn into the ends 32, 36 of the intermittent bond 16 at the saddle surfaces 38. FIG. 11 depicts a section taken across the width of the subunits 14 shown in FIG. 17. FIG. 18 demonstrates the profile of the intermittent bond 16 in which the thickness is decreased at the midpoint of the intermittent bond 16 between the subunits 14 as compared to the thickness adjacent to the subunits 14. Additionally, FIG. 18 depicts the diffusion zone 30 between the subunit coating 28 and the intermittent bond 16.

Figure 19:
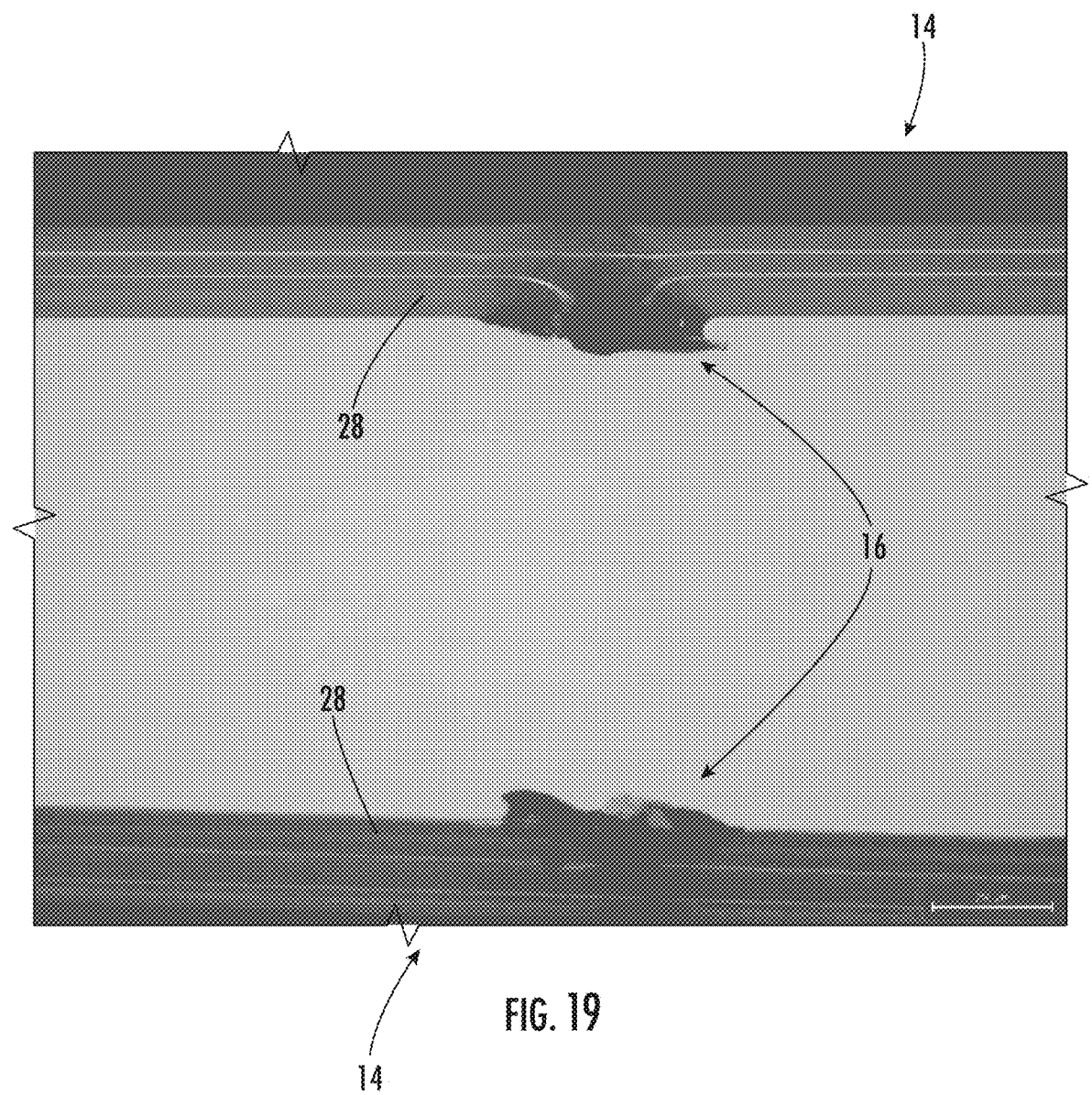
FIGS. 19 and 20 depict breakage of the intermittent bond, according to exemplary embodiments.
Figure 20:
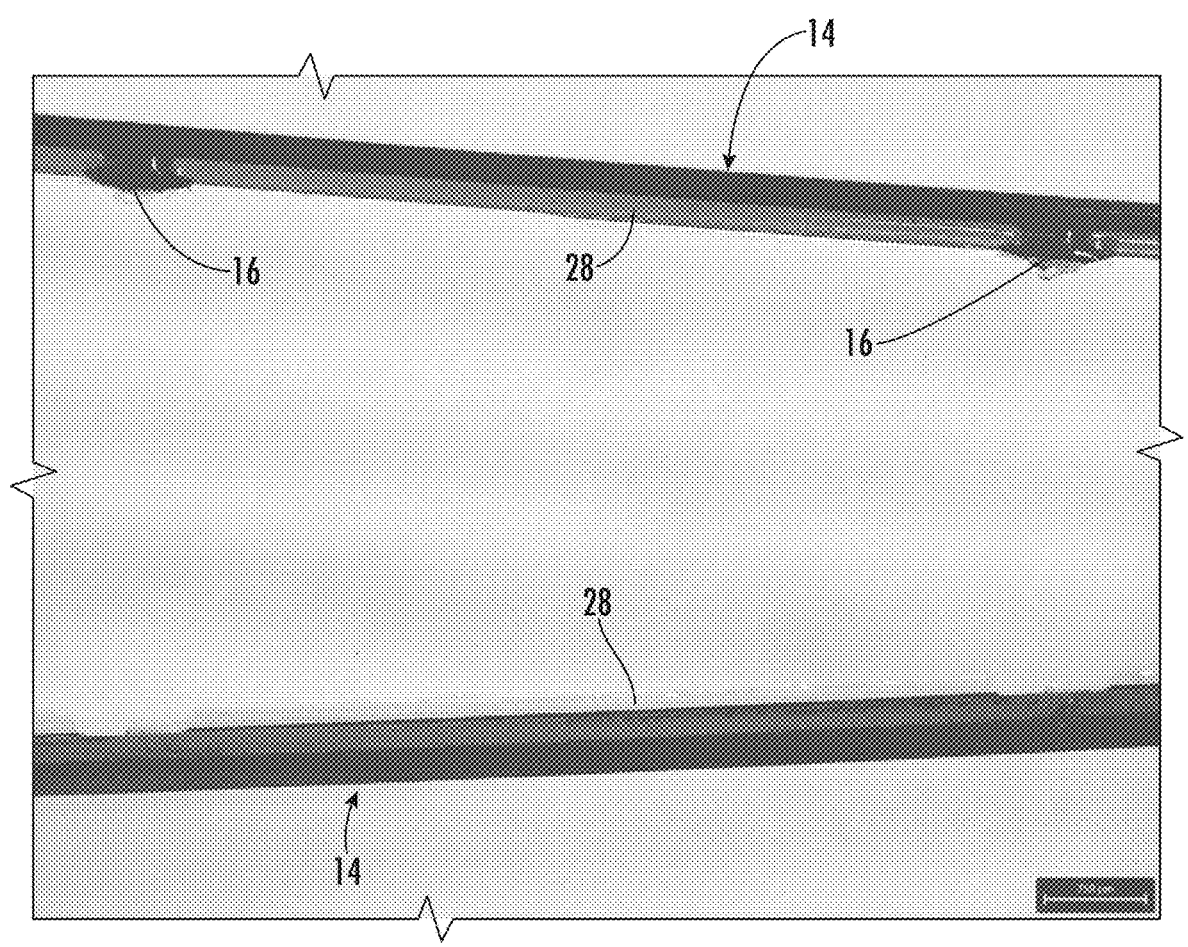

FIGS. 19 and 20 depict different breakages of the intermittent bond 16 when pulled apart. FIG. 19 depicts a cohesive failure of the intermittent bond 16. That is, the point of failure was located within the intermittent bond 16 itself instead of at an interface between the subunit coating 28 and the intermittent bond 16. In embodiments, the cohesive failure of the intermittent bond 16 occurs at a force of 1 gf to 35 gf as measured according to a T-peel test in which the ends of adjacent subunits 14 are pulled in opposite directions until the intermittent bond 16 breaks. As mentioned above, the intermittent bond 16 allows the subunits 14 to operate like an optical fiber ribbon 10 while also providing the fiber density advantages of loose tube fibers. When installing the optical fibers 12, the subunits 14 may need to be separated in order to route the optical fibers appropriately. Thus, breakage of the intermittent bond 16 is built into the design of the intermittent bond 16. Further, as discussed above, the length and/or width of the intermittent bond can be manipulated to provide a greater or lower breaking strength. Still further, the materials of the intermittent bond 16 and/or subunit coating 28 can be manipulated to provide a desired breaking strength. In that regard, FIG. 20 depicts an adhesive failure in which the intermittent bond 16 separates from the subunit 14. In practice, the breakage may be the result of a combination of adhesive and cohesive failure in view of the diffusion zone 30 in which the materials of the subunit coating 28 and of the intermittent bond 16 are mixed.

Figure 21:
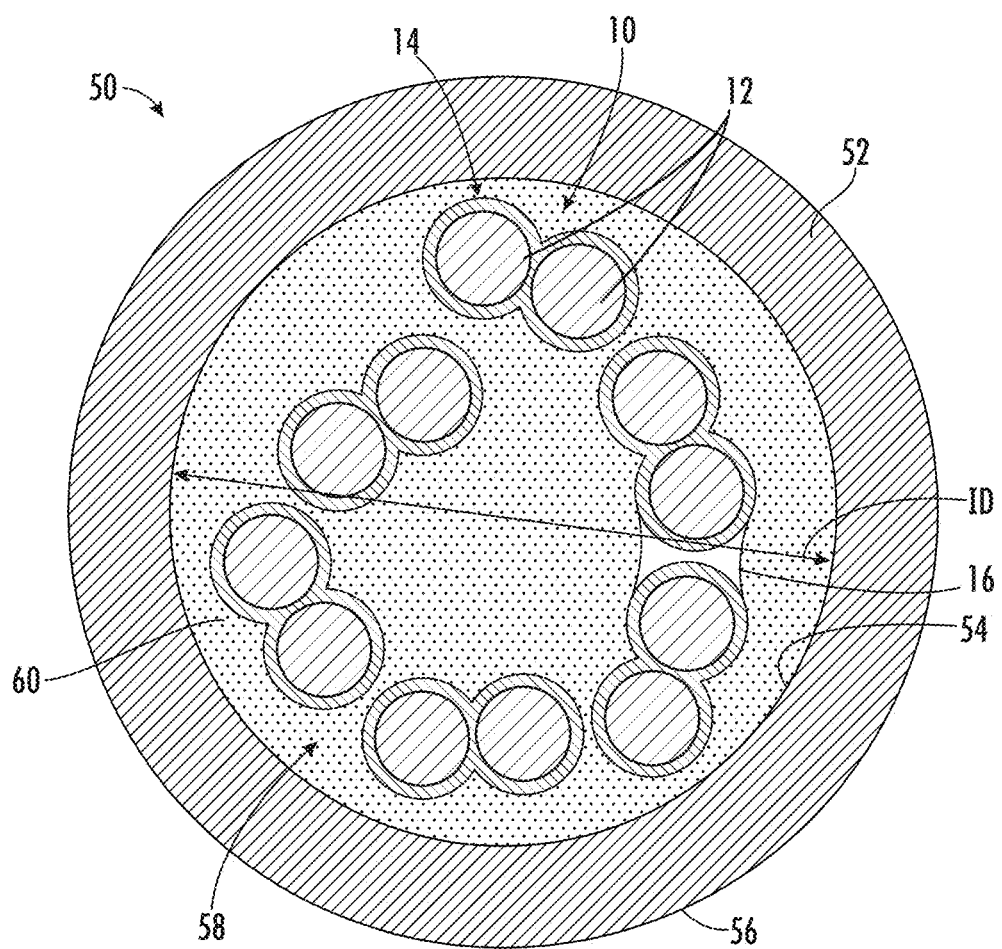
FIG. 21 depicts an optical fiber cable including the intermittently bonded optical fiber ribbon, according to an exemplary embodiment.

As mentioned above, the intermittently bonded optical fiber ribbon 10 allows for smaller cable diameters and/or higher fill ratios. FIG. 21 depicts an exemplary embodiment of an optical fiber cable or buffer tube 50 containing an intermittently bonded optical fiber ribbon 10. The optical fiber cable 50 has a cable jacket 52 with an inner surface 54 and an outer surface 56. The inner surface 54 defines a central bore 58 containing the optical fiber ribbon 10. The central bore 58 has a diameter, which is the inner diameter ID of the cable jacket 52. As shown in FIG. 21, the central bore 58 is also filled with filling material 60, which may be, e.g., strength members (such as aramid, cotton, basalt, and/or glass yarns), water blocking gels or powders, and/or fire retardant materials, among others.

Conventionally, the inner diameter of the cable jacket had to be at least as large as the width of the optical fiber ribbon in the planar configuration in order to accommodate the entire optical fiber ribbon. However, this meant that much of the interior space of the optical fiber jacket went unfilled. According to the present disclosure, smaller cable diameters and/or higher fiber density ratios are achievable by reducing the maximum cross-sectional dimension of the optical fiber ribbon 10. In particular, by rolling, curling, or folding the optical fiber ribbon 10 into, e.g., a circle or spiral or (continuous/alternating) helix, the inner diameter ID of the cable 50 can be smaller, providing an overall smaller and more densely filled cable design. Notwithstanding, the optical fiber ribbon 10 can still be removed from the optical fiber cable 50, flattened into the planar configuration, and then easily be mass fusion spliced like a conventional optical fiber ribbon. For the sake of simplicity, a single optical fiber ribbon 10 was shown in the optical fiber cable 50. However, in other embodiments, the optical fiber cable 50 may contain several tens or hundreds of optical fiber ribbons 10. Further, such optical fiber ribbons 10 may be arranged in one or more buffer tubes within the central bore 58 of the cable jacket 52.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:
a plurality of subunits each comprising a subunit coating surrounding at least one optical fiber, the subunit coating comprising a first material;
a plurality of bonds intermittently formed between adjacent subunits of the plurality of subunits, the plurality of bonds comprising a second material;
wherein each bond of the plurality of bonds has a unique longitudinal position along a length of the optical fiber ribbon such that no other bond of the plurality of bonds is located at the unique longitudinal position; and
wherein each bond of the plurality of bonds comprises a diffusion zone comprising a mixture of the first material and the second material.

2. The optical fiber ribbon of claim 1, wherein the plurality of subunits comprises at least one pair of adjacent subunits and, for each pair of adjacent subunits, bonds of the plurality of bonds are separated by a first distance.

3. The optical fiber ribbon of claim 2, wherein the first distance is from 15 mm to 200 mm.

4. The optical fiber ribbon of claim 2, wherein the at least one pair of adjacent subunits comprises:

a first pair of subunits comprising a first subunit joined to a second subunit with first bonds of the plurality of bonds that are separated by the first distance; and a second pair of subunits comprising the second subunit joined to a third subunit with second bonds of the plurality of bonds that are separated by the first distance;

wherein the first bonds are longitudinally offset from the second bonds by the first distance divided by an irrational number.

5. The optical fiber ribbon of claim 4, wherein the irrational number is the golden ratio.

6. The optical fiber ribbon of claim 4, wherein subsequent pairs of subunits comprise a subunit of a previous pair joined to a further subunit of the plurality of subunits with subsequent bonds and wherein the subsequent bonds are longitudinally offset by the first distance divided by the irrational number.

7. The optical fiber ribbon of claim 6, wherein the optical fiber ribbon comprises up to six subunits and wherein the first bonds, the second bonds, and the subsequent bonds comprise a maximum bond length equal to the first distance multiplied by 0.15.

8. The optical fiber ribbon of claim 6, wherein the optical fiber ribbon comprises up to twelve subunits and wherein the first bonds, the second bonds, and the subsequent bonds comprise a maximum bond length equal to the first distance multiplied by 0.056.

9. The optical fiber ribbon of claim 6, wherein the optical fiber ribbon comprises up to sixteen subunits and wherein the first bonds, the second bonds, and the subsequent bonds comprise a maximum bond length equal to the first distance multiplied by 0.034.

10. The optical fiber ribbon of claim 2, wherein the plurality of subunits comprises a first number (N) of subunits and wherein the at least one pair of adjacent subunits comprises:

a first pair of subunits comprising a first subunit joined to a second subunit with first bonds of the plurality of bonds that are separated by the first distance (A);

a second pair of subunits comprising the second subunit joined to a third subunit with second bonds of the plurality of bonds that are separated by the first distance (A);

a third pair of subunits comprising the third subunit joined to a fourth subunit with third bonds of the plurality of bonds that are separated by the first distance (A); and a fourth pair of subunits comprising the fourth subunit joined to a fifth subunit with fourth bonds of the plurality of bonds that are separated by the first distance (A);

wherein the first bonds are longitudinally offset from the second bonds by a second distance (B) in which $0.5A \leq B < A$;

wherein the first bonds are longitudinally offset from the third bonds and the second bonds are offset from the fourth bonds by a third distance (B') in which B' is equal to about A/(N−1).

11. The optical fiber ribbon of claim 10, wherein the third bonds are offset from the first bonds in a first direction, wherein the fourth bonds are offset from the second bonds in a second direction, and wherein the first direction is the same as the second direction.

12. The optical fiber ribbon of claim 10, wherein the third bonds are offset from the first bonds in a first direction, wherein the fourth bonds are offset from the second bonds in a second direction, and wherein the first direction is opposite to the second direction.

13. The optical fiber ribbon of claim 10, wherein the optical fiber ribbon comprises a fifth pair of subunits comprising the fifth subunit joined to a sixth subunit with fifth bonds of the plurality of bonds that are separated by the first distance (A); and wherein the first bonds, the second bonds, the third bonds, the fourth bonds, and the fifth bonds comprise a maximum bond length equal to the first distance multiplied by 0.2.

14. The optical fiber ribbon of claim 10, wherein subsequent pairs of subunits comprise a subunit of a previous pair joined to a further subunit of the plurality of subunits with subsequent bonds that are separated by the first distance (A);

wherein the plurality of subunits comprises up to twelve subunits; and wherein the first bonds, the second bonds, the third bonds, the fourth bonds, and the subsequent bonds comprise a maximum bond length equal to the first distance multiplied by 0.091.

15. The optical fiber ribbon of claim 10, wherein subsequent pairs of subunits comprise a subunit of a previous pair joined to a further subunit of the plurality of subunits with subsequent bonds that are separated by the first distance (A);

wherein the plurality of subunits comprises up to sixteen subunits; and wherein the first bonds, the second bonds, the third bonds, the fourth bonds, and the subsequent bonds comprise a maximum bond length equal to the first distance multiplied by 0.067.

16. A method of preparing an optical fiber ribbon, comprising:

arranging a plurality of optical fibers adjacent to each other along a length of the optical fiber ribbon;

applying a coating comprising a first material around the plurality of optical fibers to create a plurality of subunits, each subunit of the plurality of subunits comprising at least one optical fiber;

intermittently applying a plurality of bonds comprising a second material between adjacent subunits of the plurality of subunits, wherein the second material diffuses into the first material creating a diffusion zone of the second material in the first material and wherein each bond of the plurality of bonds is located at a unique longitudinal position along the length of the optical fiber ribbon;

curing the first material and the second material.

17. The method of claim 16, wherein intermittently applying bonds further comprises applying bonds between pairs of adjacent subunits of the plurality of subunits so that each pair of adjacent subunits comprises bonds separated by a first distance along the length of the optical fiber ribbon.

18. The method of claim 17, wherein the first distance is from 15 mm to 200 mm.

19. The method of claim 17, wherein pairs of adjacent subunits comprise:

a first pair of subunits comprising a first subunit joined to a second subunit with first bonds of the plurality of bonds that are separated by the first distance; and a second pair of subunits comprising the second subunit joined to a third subunit with second bonds of the plurality of bonds that are separated by the first distance;

wherein the step of applying further comprises longitudinally offsetting the first bonds from the second bonds by the first distance divided by an irrational number.

20. The method of claim 19, wherein the first bonds and the second bonds comprise a maximum bond length of the first distance multiplied by 0.15.

21. The method of claim 17, wherein the plurality of subunits comprises a first number (N) of subunits and wherein the pairs of adjacent subunits comprises:
   a first pair of subunits comprising a first subunit joined to a second subunit with first bonds of the plurality of bonds that are separated by the first distance (A);
   a second pair of subunits comprising the second subunit joined to a third subunit with second bonds of the plurality of bonds that are separated by the first distance (A);
   a third pair of subunits comprising the third subunit joined to a fourth subunit with third bonds of the plurality of bonds that are separated by the first distance (A); and
   a fourth pair of subunits comprising the fourth subunit joined to a fifth subunit with fourth bonds of the plurality of bonds that are separated by the first distance (A);
   wherein the step of applying further comprises:
      longitudinally offsetting the first bonds from the third bonds by about a second distance (B) in which $0.5A \leq B < A$; and
      longitudinally offsetting the third bonds from the first bonds and the second bonds from the fourth bonds by a third distance (B') in which B' is equal to about A/(N−1).

22. The method of claim 21, wherein the first bonds, the second bonds, the third bonds, and the fourth bonds comprise a maximum bond length of the first distance multiplied by 0.2.

23. An optical fiber ribbon, comprising:
   a first subunit comprising a first coating and at least one first optical fiber, the first coating surrounding the at least one first optical fiber;
   a second subunit comprising a second coating and at least one second optical fiber, the second coating surrounding the at least one second optical fiber;
   a third subunit comprising a third coating and at least one third optical fiber, the third coating surrounding the at least one third optical fiber;
   a first set of bonds intermittently located along a length of the optical fiber ribbon, the first set of bonds joining the first subunit and the second subunit; and
   a second set of bonds intermittently located along the length of the optical fiber ribbon, the second set of bonds joining the second subunit and the third subunit;
   wherein the first set of bonds and the second set of bonds do not overlap across a width of the optical fiber ribbon; and
   wherein each bond of the first set of bonds and of the second set of bonds comprises at least one saddle point.

24. The optical fiber ribbon of claim 23, wherein the first set of bonds comprises bonds between the first subunit and the second subunit that are separated by a first distance and wherein the first distance is from 15 mm to 200 mm.

25. The optical fiber ribbon of claim 24, wherein the first set of bonds, the second set of bonds, and the third set of bonds comprise a maximum bond length of the first distance multiplied by 0.2.

* * * * *